(12) United States Patent
Santini

(10) Patent No.: US 6,337,783 B1
(45) Date of Patent: *Jan. 8, 2002

(54) WRITE HEAD WITH MULTI-STITCHED SECOND POLE PIECE

(75) Inventor: Hugo Alberto Emilio Santini, San Jose, CA (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/133,793

(22) Filed: Aug. 12, 1998

(51) Int. Cl.⁷ .............................. G11B 5/39; G11B 5/127
(52) U.S. Cl. ........................................ 360/317; 360/125
(58) Field of Search ................................ 360/113, 125, 360/126, 317

(56) References Cited

U.S. PATENT DOCUMENTS

| | | | |
|---|---|---|---|
| 4,589,042 A | 5/1986 | Anderson et al. | 360/125 |
| 4,839,197 A | 6/1989 | Henderson | 427/116 |
| 5,245,493 A | 9/1993 | Kawabe et al. | 360/126 |
| 5,282,308 A | 2/1994 | Chen et al. | 29/603 |
| 5,473,491 A * | 12/1995 | Fujisawa et al. | 360/126 |
| 5,543,989 A | 8/1996 | Westwood | 360/113 |
| 5,652,687 A | 7/1997 | Chen et al. | 360/126 |
| 5,805,391 A * | 9/1998 | Chang et al. | 360/113 |

FOREIGN PATENT DOCUMENTS

| | | |
|---|---|---|
| JP | 57-78613 | 5/1982 |
| JP | 360010409 A | 1/1985 |
| JP | 361178710 A | 8/1986 |
| JP | 362205510 A | 9/1987 |
| JP | 362245509 A | 10/1987 |
| JP | 408339508 A | 12/1996 |

OTHER PUBLICATIONS

Paton, A., "Electromagneic Transducer with Thin–Film Pole Pieces", IBM Technical Disclosure Bulletin, vol. 15, No. 7, Dec. 1972.

* cited by examiner

Primary Examiner—George J. Letscher
(74) Attorney, Agent, or Firm—Gray Cary Ware & Friedenrich; Ervin F. Johnston

(57) ABSTRACT

In the present invention a second pole yoke component of a second pole piece is connected (stitched) to a small top surface of a second pole tip component of the second pole piece as well as to a back edge and first and second side edges of the second pole tip component. The extra stitching at the back and side edges provides the required magnetic coupling between the components for transferring flux to and from a second pole tip at an air bearing surface. This arrangement shortens the length of the top stitched area so that one or more coil layers in an insulation stack can be located closer to the ABS for increasing the data rate of the head. Further, this arrangement reduces the amount of material of the second pole piece layer in close proximity to the first pole piece layer so as to minimize flux leakage therebetween.

43 Claims, 17 Drawing Sheets

WRITE HEAD WITH MULTI-STITCHED SECOND POLE PIECE

BACKGROUND OF THE INVENTION

1. Field of the Invention

The present invention relates to a write head with a multi-stitched second pole piece and more particularly to a write head wherein the second pole piece has a second layer component that is stitched (magnetically connected by engagement) to top, back and first and second side edges of a first layer component.

2. Description of the Related Art

The heart of a computer is an assembly that is referred to as a magnetic disk drive. The magnetic disk drive includes a rotating magnetic disk, write and read heads that are suspended by a suspension arm above the rotating disk and an actuator that swings the suspension arm to place the read and write heads over selected circular tracks on the rotating disk. The read and write heads are directly mounted on a slider that has an air bearing surface (ABS). The suspension arm biases the slider into contact with the surface of the disk when the disk is not rotating but, when the disk rotates, air is swirled by the rotating disk adjacent the ABS to cause the slider to ride on an air bearing a slight distance from the surface of the rotating disk. The write and read heads are employed for writing magnetic impressions to and reading magnetic impressions from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head. The pole piece layers are connected at a back gap. Current conducted through the coil layer induces a magnetic field across the gap between the pole pieces. This field fringes across the gap at the ABS for the purpose of writing information in tracks on moving media, such as in circular tracks on a rotating disk.

The second pole piece layer has a pole tip portion which extends from the ABS to a flare point and a yoke portion which extends from the flare point to the back gap. The flare point is where the second pole piece first begins to widen (flare) after the ABS to form the yoke. The placement of the flare point directly affects the magnitude of the write field at the recording medium. Since the magnetic flux decays as it travels down the length of the second pole tip, more flux will reach the recording media if the length of the second pole tip is made short. Therefore, optimal performance can be achieved by aggressively placing the flare point close to the ABS so that the second pole tip is short.

Another parameter important in the design of the write head is the location of the zero throat height (ZTH). Zero throat height is the location where the first and second pole pieces first separate from one another after the ABS. The ZTH separation is caused by the contour of an insulation layer, typically the first insulation layer in the insulation stack. Flux leakage between the first and second pole pieces is minimized by locating the ZTH as close as possible to the ABS.

Unfortunately, the aforementioned design parameters present a dilemma in the fabrication of the second pole tip. The second pole tip should be well-defined in order to produce well-defined written tracks on the rotating disk. Poor definition of the second pole tip may result in overwriting of adjacent tracks. A well-defined second pole tip should have parallel planar side walls which are perpendicular to the horizontal plane of the first pole piece layer. In many prior art write heads the second pole tip is formed along with the yoke after the formation of the first insulation layer, the coil layer and the second and third insulation layers of the insulation stack. Each insulation layer includes a hard-baked photoresist having a sloping front surface.

The sloping surface of each insulation layer has an apex angle with respect to a plane normal to the ABS. After construction, the first, second and third insulation layers present sloping surfaces which face the ABS. The sloping surfaces of the hard-baked resist exhibit a high optical reflectivity when they are coated with a seedlayer for the purpose of frame plating the second pole piece layer. When the second pole tip and yoke are constructed, a thick layer of photoresist is spun on top of the coated insulation layers and photo patterned to shape the second pole tip, using a conventional photo-lithography technique. In the photo-lithography step, light is directed vertically through slits in an opaque mask, exposing areas of the photoresist which are to be removed by a subsequent development step. One of the areas to be removed is the area where the second pole piece (pole tip and yoke) are to be formed by plating. Unfortunately, when the location of the flare point is placed on the sloping surfaces of the insulation layers light is reflected forward toward the ABS into photoresist areas at the sides of the second pole tip area. After developing, the side walls of the photoresist are notched which causes the pole tip to be poorly formed after plating. This is called "reflective notching" which causes overwriting of adjacent tracks on a rotating disk. It should be evident that, if the flare point is recessed far enough into the head, the effect of reflective notching would be reduced or eliminated since it would occur behind the sloping surfaces. However, this solution produces a long second pole tip which quickly degrades the head's ability to effectively write on the recording medium.

In order to overcome the aforementioned reflective notching problem some second pole pieces are constructed from two or more layer components wherein a front layer component forms the second pole tip and a back layer component forms a yoke portion of the second pole piece. The second pole tip component may be constructed after a zero throat height (ZTH) defining insulation layer, but before other insulation layers to eliminate the reflective notching problem. After forming the write gap layer and the ZTH defining insulation layer, a photoresist layer is spun on the partially completed head. The photoresist layer is mostly flat so that light from the photo-patterning step is not reflected forward into a pole tip region. The second pole tip component is then frame plated into a well formed opening in the photoresist layer and then the photoresist layer is removed. The sequence of construction is then the first insulation layer, the coil layer and the second and third insulation layers. The second pole yoke component is then frame plated causing it to be stitched to the top surface of the second pole tip component. The write head formed by this process is referred to as a stitched write head.

While the stitched write head overcomes the reflective notching problem it presents additional problems. The top surface of the second pole tip component is required to have sufficient area for stitching it to the second pole yoke component. Prior art stitching schemes cause additional flux to be leaked between the second pole tip component and the first pole piece layer since the second pole tip component is closer to the first pole piece layer over a greater area. Prior art stitching also requires the one or more coil layers to be located further back in the head which increases the reluctance of the write head circuit which, in turn, increases the rise time and decreases the data rate of the signal. Further, when the second pole tip component extends to the ABS the second pole tip component and the first pole piece layer form a T configuration. During operation of the head flux fringes from the cross of the T to the upright portion of the T which causes overwriting of adjacent tracks.

SUMMARY OF THE INVENTION

The present invention provides a unique stitching scheme wherein the stitched area at the top surface of the second pole tip component is reduced. This is accomplished by stitching the second pole yoke component to a much smaller top surface of the second pole tip component as well as to a back edge and first and second side edges of the second pole tip component. The extra stitching at the back edge and the first and second side edges of the second pole tip and yoke component provides the required magnetic coupling between the second pole tip and yoke components to transfer flux therebetween. This arrangement shortens the length of the top stitched area so that one or more coil layers can be located closer to the ABS for increasing the data rate of the head. Further, this arrangement reduces the amount of material of the second pole piece layer in close proximity to the first pole piece layer so as to minimize flux leakage therebetween.

In a preferred embodiment of the invention a ZTH defining layer, other than one of the aforementioned insulation layers, separates the second pole tip component from the first pole piece layer so as to further minimize flux leakage between the pole pieces. The flare point of the second pole tip component is preferably located on a flat portion of the ZTH defining layer so as to prevent reflective notching. In another preferred embodiment one of the insulation layers of the insulation stack is spaced from the back and first and second side edges of the second pole tip component so as to form a U shaped trench in which a front portion of the second pole yoke component is located. The invention is easily adapted to single or multiple coil layers, an inset ZTH defining layer and sunken first pole piece types of write heads. It is also preferred that the second pole tip component be recessed from the ABS so as to minimize flux leakage between the pole tips at the ABS.

An object of the present invention is to provide a stitched write head wherein one or more coil layers can be moved closer to the ABS so as to minimize reluctance and increase the data rate of the write head circuit.

Another object is to provide a stitched write head wherein flux leakage between the first and second pole pieces is reduced.

A further object is to provide a more efficient write head wherein reflective notching has been obviated, the data rate has been increased and flux leakage between the first and second pole pieces has been reduced.

Other objects and advantages of the invention will become apparent upon reading the following description taken together with the accompanying drawings.

DESCRIPTION OF THE PREFERRED EMBODIMENTS

Magnetic Disk Drive

Figure 1:
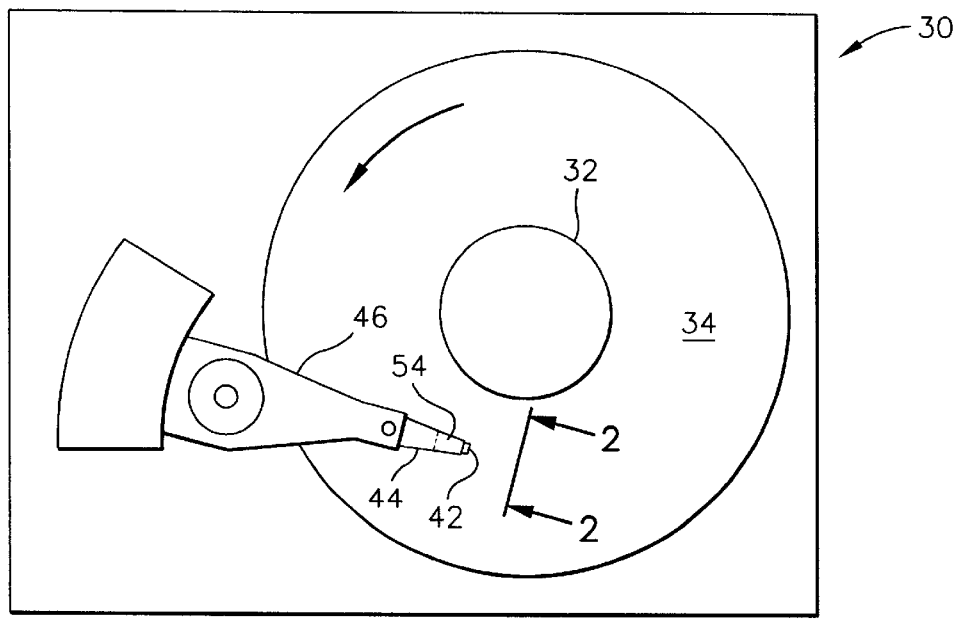
FIG. 1 is a plan view of an exemplary magnetic disk drive.
Figure 2:
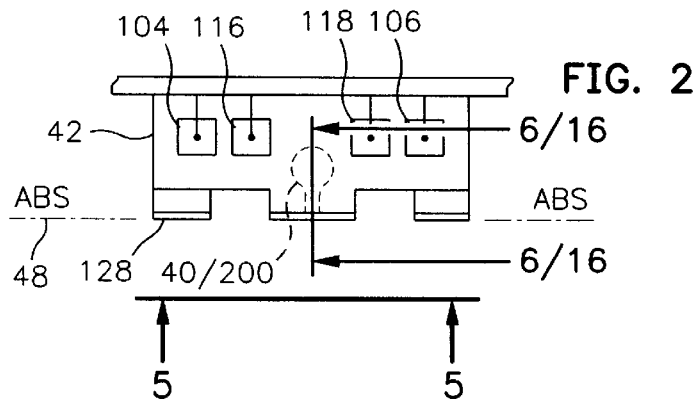
FIG. 2 is an end view (trailing edge) of a slider taken along plane 2—2 showing a magnetic head in hidden lines.
Figure 3:
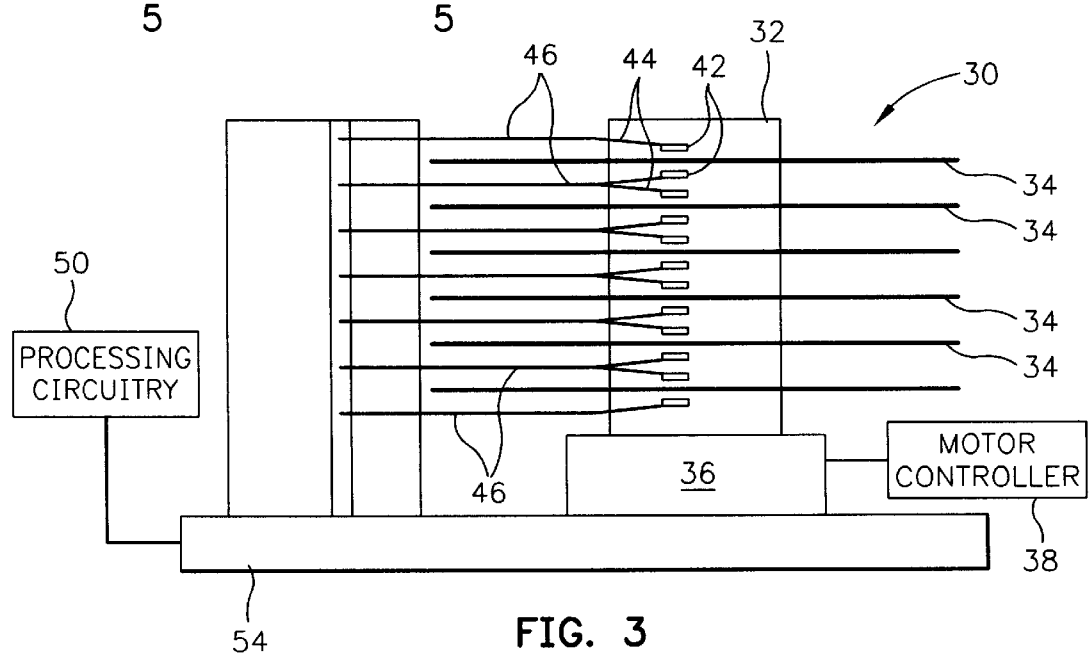
FIG. 3 is an elevation view of the magnetic disk drive of FIG. 1 wherein multiple disks and magnetic heads are employed.
Figure 4:
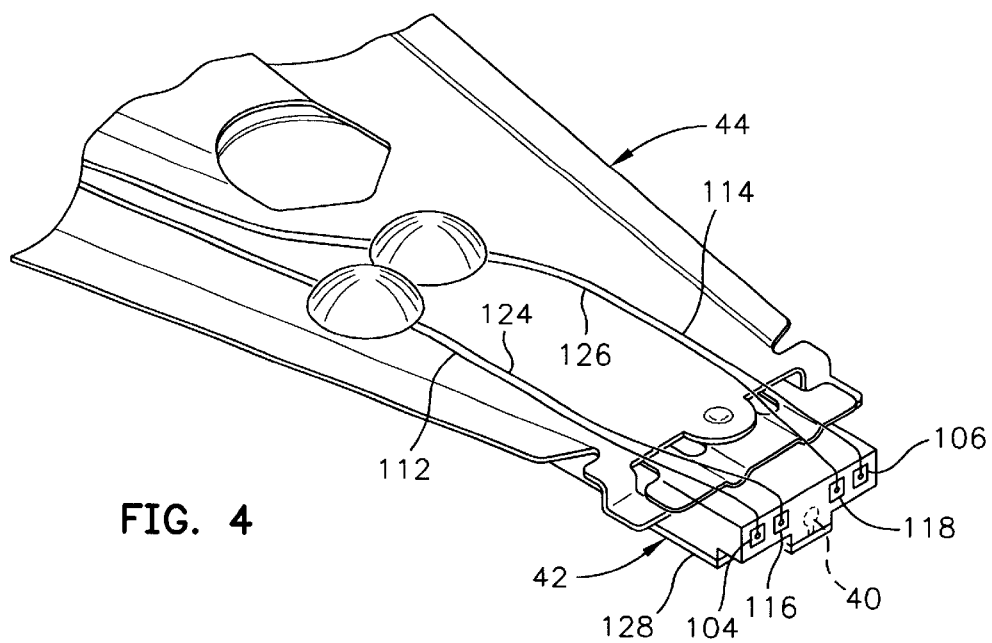
FIG. 4 is an isometric illustration of an exemplary suspension system for supporting the slider and magnetic head.

Referring now to the drawings wherein like reference numerals designate like or similar parts throughout the several views there is illustrated in FIGS. 1–3 a magnetic disk drive 30. The drive 30 includes a spindle 32 that supports and rotates a magnetic disk 34. The spindle 32 is rotated by a motor 36 that is controlled by a motor controller 38. A combined read and write magnetic head 40 is mounted on a slider 42 that is supported by a suspension 44 and actuator arm 46. A plurality of disks, sliders and suspensions may be employed in a large capacity direct access storage device (DASD) as shown in FIG. 3. The suspension 44 and actuator arm 46 position the slider 42 so that the magnetic head 40 is in a transducing relationship with a surface of the magnetic disk 34. When the disk 34 is rotated by the motor 36 the slider is supported on a thin (typically, 0.05 m) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides motor drive signals for rotating the magnetic disk 34, and provides control signals for moving the slider to various tracks. In FIG. 4 the slider 42 is shown mounted to the suspension 44. The components described hereinabove may be mounted on a frame 54, as shown in FIG. 3.

Figure 5:
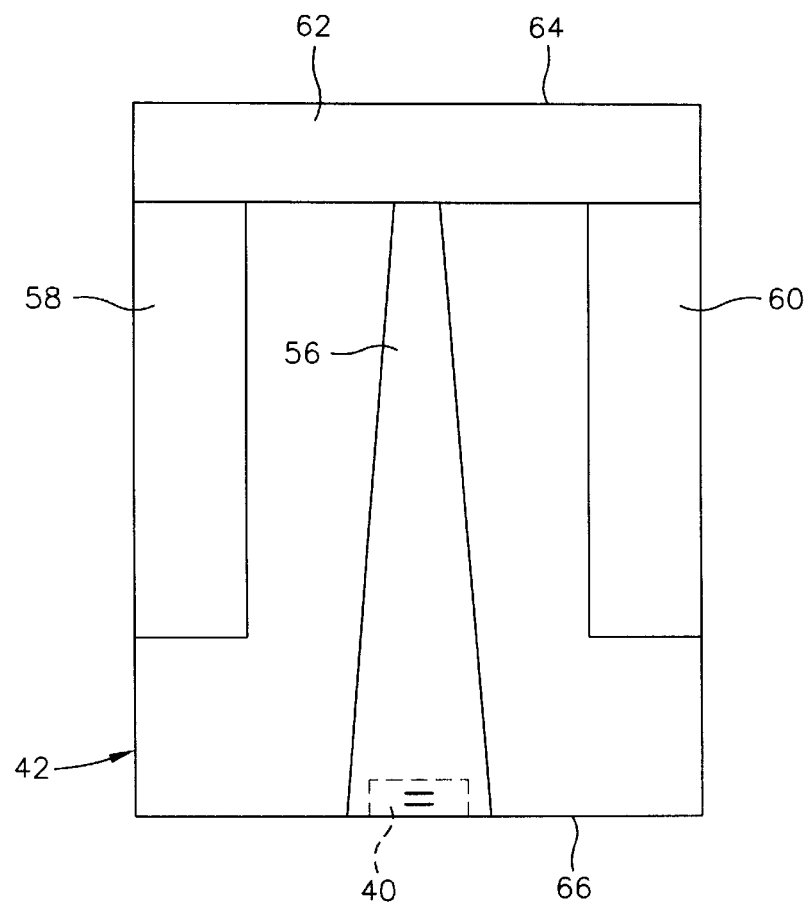
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Prior Art Merged Head

Figure 6:
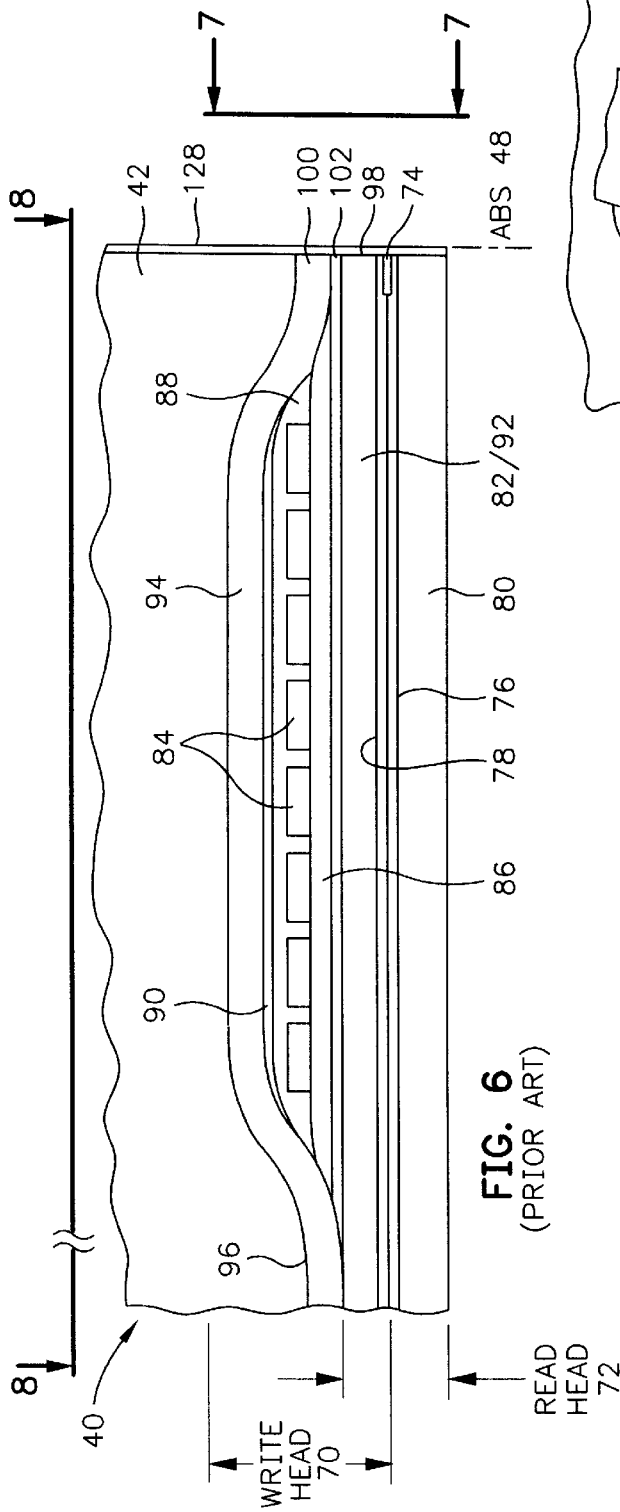
FIG. 6 is a partial view of the slider and prior art magnetic head as seen in plane 6—6 of FIG. 2.
Figure 7:
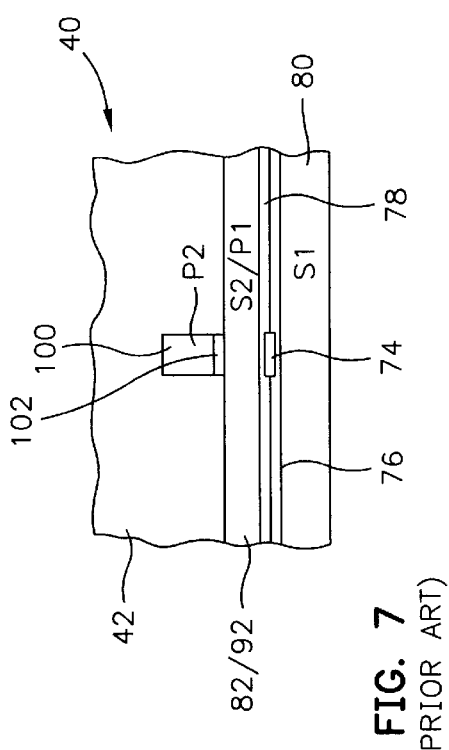
FIG. 7 is a partial ABS view of the slider taken along plane 7—7 of FIG. 6 to show the read and write elements of the prior art magnetic head.

FIG. 6 is a side cross-sectional elevation view of the merged MR or spin valve head 40 which has a prior art write head portion 70 and a read head portion 72, the read head portion employing an MR or spin valve sensor 74. FIG. 7 is an ABS view of FIG. 6. The sensor 74 is located between first and second gap layers 76 and 78 and the gap layers are located between first and second shield layers 80 and 82. The resistance of the sensor 74 changes in response to external magnetic fields. A sense current Is conducted through the sensor causes these resistance changes to be manifested as potential changes. These potential changes are then processed as readback signals by the processing circuitry 50 shown in FIG. 3.

Figure 8:
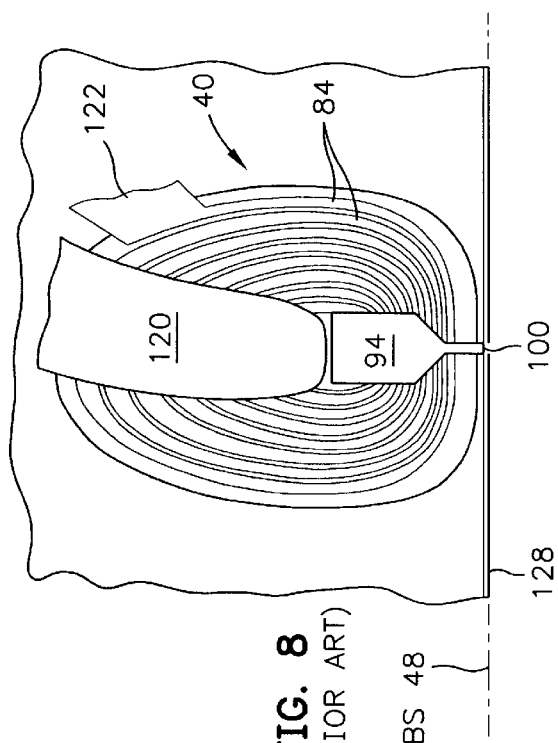
FIG. 8 is a view taken along plane 8—8 of FIG. 6 with the second pole piece and all material thereabove removed.

The prior art write head portion of the merged head includes a coil layer 84 located between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are located between first and second pole piece layers 92 and 94. The first and second pole piece layers 92 and 94 are magnetically coupled at a back gap 96 and have first and second pole tips 98 and 100 which are separated by a write gap layer 102 at the ABS. As shown in FIGS. 2 and 4, first and second solder connections 104 and 106 connect leads from the sensor 74 to leads 112 and 114 on the suspension 44 and third and fourth solder connections 116 and 118 connect leads 120 and 122 from the coil 84 (see FIG. 8) to leads 124 and 126 on the suspension. A wear layer 128 may be employed for protecting the sensitive elements of the magnetic head, as shown in FIGS. 2, 4, 6 and 7. It should be noted that the merged head 50 employs a single layer 82/92 to serve a double function as a second shield layer for the read head and as a first pole piece for the write head. A piggyback head employs two separate layers for these functions.

The second pole piece layer 94 has a pole tip region and a yoke region, the merging of these components being defined by a flare point which is the location where the second pole piece layer 94 first begins to widen after the ABS as it recesses in the head. The second pole tip region extends from the ABS to the flare point, and the yoke region extends from the flare point to the back gap 96.

The location of the flare point is an important design parameter of the write head. The further the flare point is recessed into the head, the longer the pole tip, which increases magnetic reluctance and the likelihood that the pole tip will saturate in response to flux from the coil layer 84. In the past it has been difficult to locate the flare point closer to the ABS than 10 m because of a fabrication problem in making the second pole tip.

Another important design parameter in making the write head is the location of a zero throat height (ZTH), which is where the first and second pole piece layers 92 and 94 first separate from one another behind the ABS. It is important to locate the ZTH as close as possible to the ABS (typically within about 1 m) in order to reduce flux loss between the pole pieces before the fields reach the write gap layer 102 at the ABS. In the prior art, locating the ZTH close to the ABS contributed to the aforementioned problem of fabricating a well-defined second pole tip.

Figure 9:
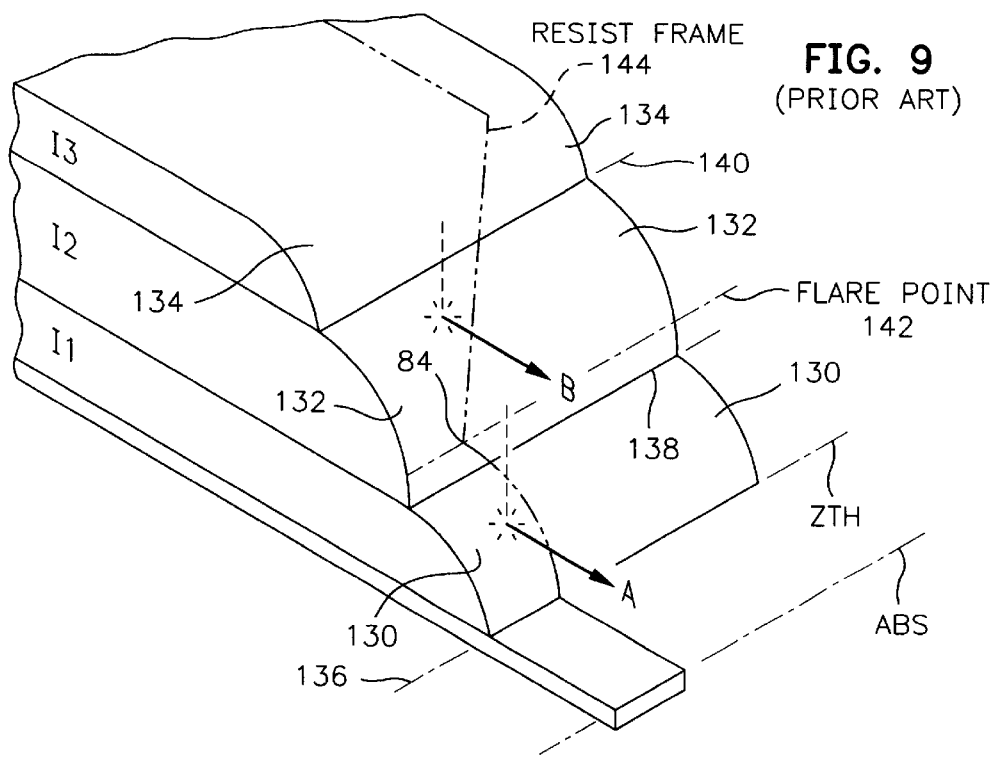
FIG. 9 is an isometric schematic illustration of a step in the construction of the second pole piece with the perimeter of a resist frame shown in phantom on first and second and third insulation layers of an insulation stack.

FIG. 9 shows the prior art head of FIG. 6 during the step of constructing the second pole piece 94 (see FIG. 6). In FIG. 9 the first, second and third insulation layers (I1, I2 and I3) are shown with sloping surfaces 130, 132 and 134, respectively, which terminate at apexes 136, 138 and 140 respectively. As stated hereinabove, the first, second and third insulation layers are hard-baked photoresist. After a seedlayer is deposited on these layers for frame plating the second pole piece layer the sloping surfaces 130, 132 and 134 are highly reflective to light. All of the sloping surfaces 130, 132 and 134 face the pole tip region where the second pole tip of the second pole piece 94 is to be formed. The second pole piece is formed with a photoresist layer spun on top of the partially completed head and planarized thereacross. The height the photoresist may be as much as 12 m thick in the pole tip region and is typically approximately 4.5 m thick above the third insulation layer (I3).

Since the flare point 142 of the second pole piece 94 (see FIG. 6) is located on the sloping surfaces of the insulation layers, light will be reflected from the sloping surfaces 130, 132 and 134 (see FIG. 9) forward toward the ABS, penetrating into photoresist side wall areas of the pole tip region and causing notching of the photoresist. This will result in the side walls of the photoresist in the pole tip region being wider than the mask employed for patterning. This is referred to as "reflective notching". The photoresist pattern for the second pole piece is shown at 144 in FIG. 9 which comprises the pole tip pattern and the yoke pattern. This is referred to as the "P2 frame". Reflective notching of the photoresist by light reflected at an angle of incidence from the sloping layers of the insulation layers is shown at "A" and "B" in FIG. 9. When light ray "A" is directed downwardly during the photo-imaging step of the photoresist, it is reflected at an angle of incidence into the pole tip region without causing any reflective notching of the second pole tip. However when light ray "B" from the photo-imaging process is reflected from the sloping surfaces of the insulation layers behind the flare point 142 it is reflected at an angle of incidence into the photoresist along a side of the intended pole tip. It is light reflection B and similar light reflections that cause reflective notching. When the second pole piece 94 is plated and the photoresist layer is removed the second pole tip 100 (see FIG. 7) is poorly formed, exhibiting irregular side walls.

Figure 10:
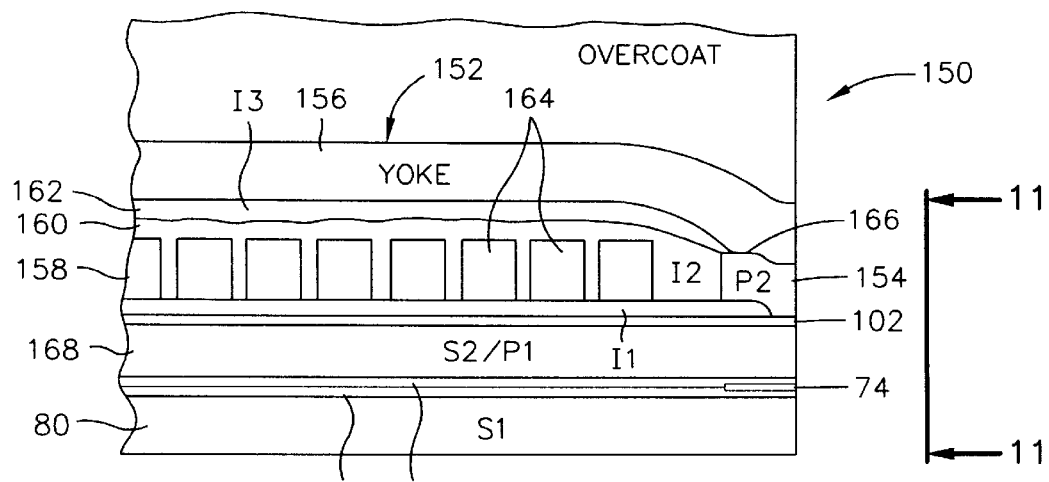
FIG. 10 is a longitudinal cross-sectional view of a merged magnetic head with a prior art stitched write head portion.
Figure 11:
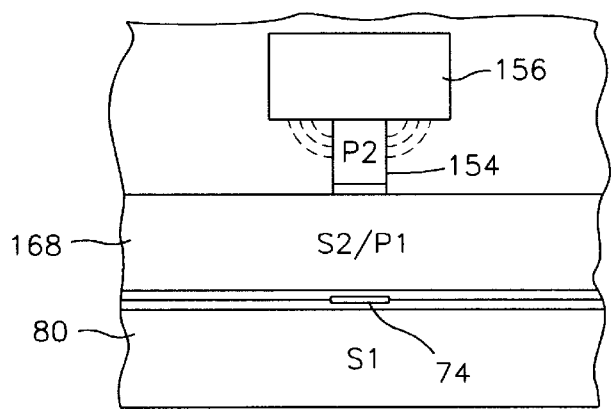
FIG. 11 is an ABS view taken along plane 11—11 of FIG. 10.

Another prior art head 150 is illustrated in FIG. 10 which differs from the prior art head, shown in FIG. 6, in that the second pole piece 152 is constructed of second pole tip and second pole yoke components 154 and 156. The second pole tip component 154 is constructed at the ABS after the first insulation layer 158 (ZTH defining layer), but before the formation of the second and third insulation layers 160 and 162 and the coil layer 164. In this structure, the photolithography step to produce the second pole tip component 154 is done right after formation of the write gap 102 and the first insulation layer 158. At this stage the surface mostly planar since the sloping insulation layers 160 and 162 have not yet been formed. Therefore, the second pole tip component 154 can be constructed with well-defined side walls. After construction of the second pole tip component 154, the coil layer 164 is formed on the first insulation layer, the second insulation layer 160 is formed on the coil layer 164 and the first insulation layer 158, and the third insulation layer 162 is formed on the second insulation layer 160. Thereafter, a photoresist layer (not shown) is photo-imaged for the construction of the second pole yoke component 156 from the ABS to the back gap (not shown). Unfortunately, the large stitch area at 166 requires that the coil layer 152 be located further back in the head. This results in increased reluctance and a slower data rate of the head. Further, the large stitch area permits more flux to leak between the second pole tip component 154 and the first pole piece layer 168. The ABS view in FIG. 11 shows the second pole yoke component 156 which, with the first component 154, results in the second pole tip at the ABS having a "T" configuration. Unfortunately, flux fringes between the front and the second pole yoke components 154 and 156, as shown by the flux lines in FIG. 11, causing overwriting of adjacent tracks on a rotating magnetic disk. The present invention overcomes the aforementioned problems.

THE INVENTION

Figure 12:
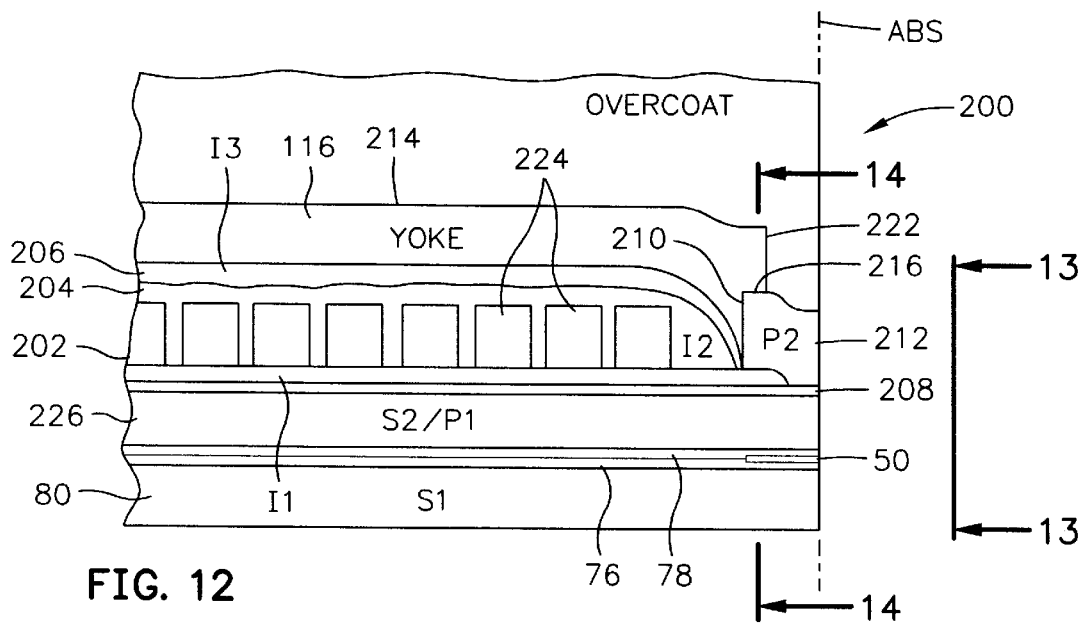
FIG. 12 is a longitudinal cross-sectional view of a portion of the present magnetic head with a multi-stitched write head portion.
Figure 14:
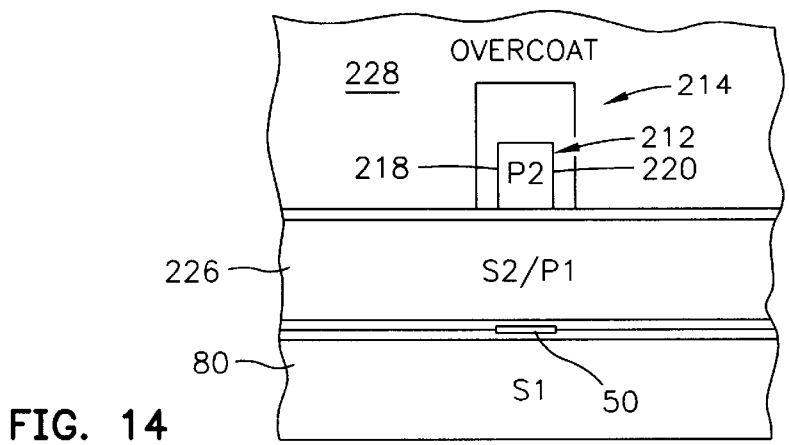
FIG. 14 is a cross-sectional view taken along plane 14—14 of FIG. 12.

In FIG. 12 a front portion of a merged head 200 with a multi-stitched write head portion of the present invention is illustrated. As shown in FIG. 12, the first insulation layer 202 defines the ZTH of the head, as in the embodiment 150 in FIG. 10, but the second and third insulation layers 204 and 206 of the insulation stack terminate on the first insulation layer 202 (I1) so that a space is provided between the insulation layers 204 and 206 and a back edge 210 of the second pole tip component 212. As shown in FIGS. 12 and 14, the second pole yoke component 214 engages a small top surface portion 216, the back edge 210 and first and second side edges 218 and 220 of the second pole tip component 212. As will be explained in more detail hereinafter, it is preferred that a front end 222 of the second pole yoke component be recessed from the ABS for minimizing side writing of the written track. The present magnetic head, shown in FIG. 12, permits the coil layer 224 to be located closer to the ABS so as to decrease reluctance and increase the data rate of the write head circuit. The stitching areas at the top surface 216, the back edge 210 and the first and second edges 218 and 220 are designed for sufficient transfer of flux between the second pole yoke component 214 to the second pole tip component 212.

Figure 13:
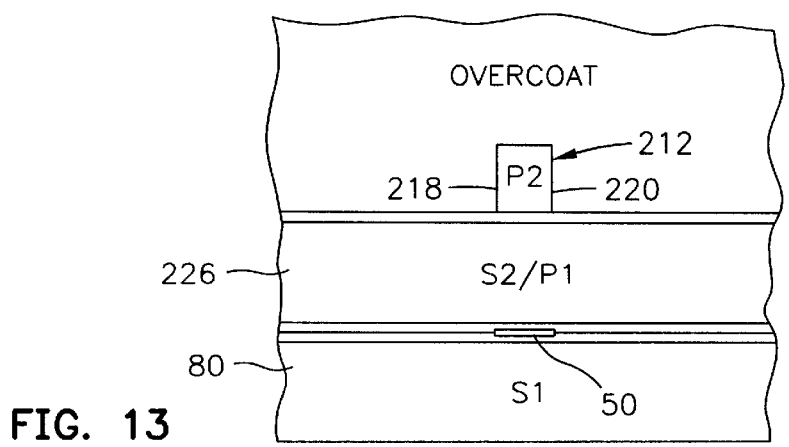
FIG. 13 is an ABS view taken along plane 13—13 of FIG. 12.

FIG. 13 is an ABS illustration of FIG. 12 showing that only the second pole tip component 212 is exposed at the ABS. It should be noted that the insulation stack including insulation layers 204 and 206 and the coil layer 224 may be constructed before or after construction of the second pole tip component 212. In a preferred embodiment, the insulation layers and the coil layer are constructed prior to the second pole tip component 212 so that the second pole tip component 212 will not be altered by the processing steps in making the insulation layers and the coil layer. As shown in FIG. 14 an overcoat layer 228 surrounds the front portion of the second pole yoke component 214.

Figure 15:
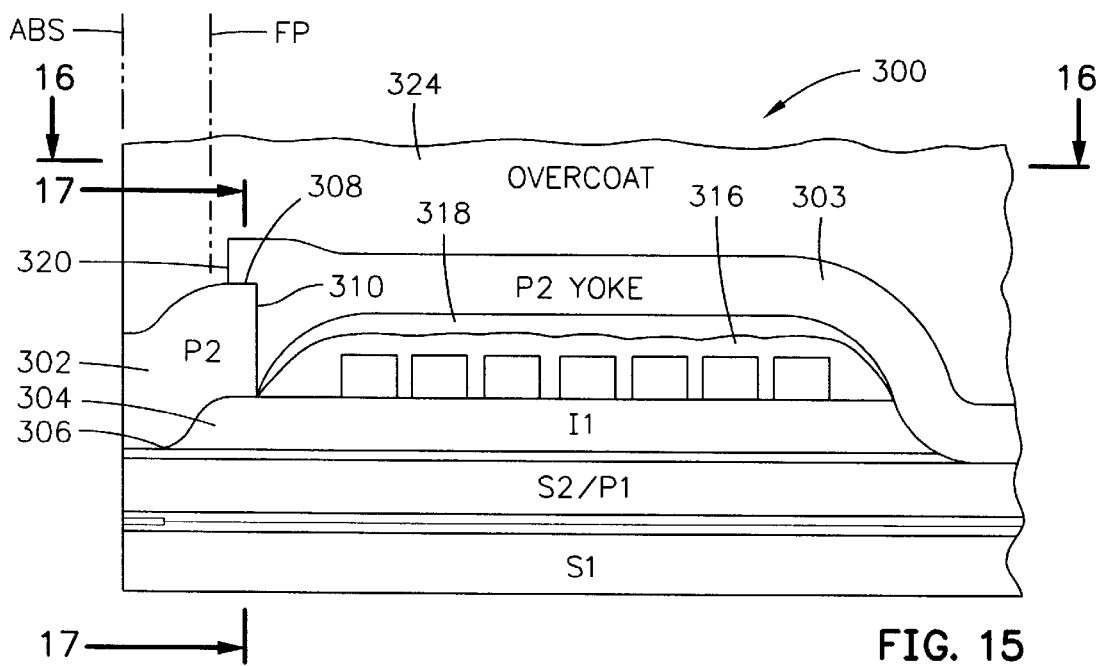
FIG. 15 is a longitudinal cross-sectional view of a portion of a merged magnetic head with another embodiment of a multi-stitched write head portion.
Figure 16:
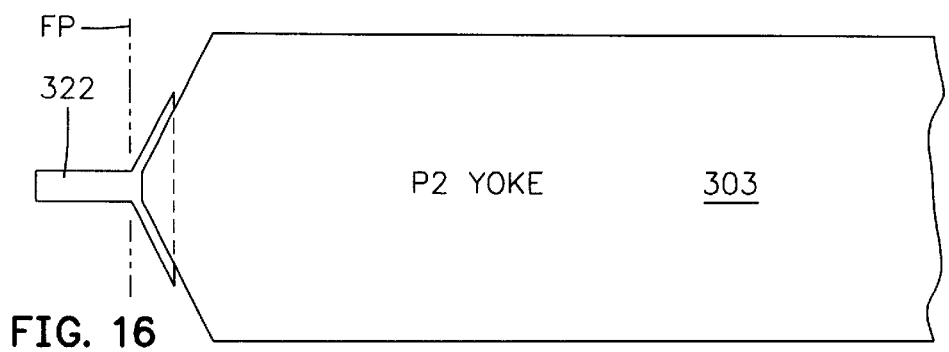
FIG. 16 is a view taken along plane 16—16 with the overcoat layer removed.
Figure 17:
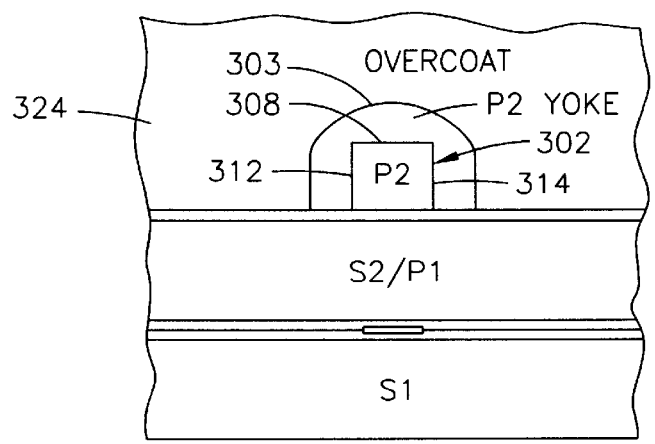
FIG. 17 is a cross-sectional view taken along plane 17—17 of FIG. 15.

FIGS. 15–17 illustrate another embodiment, 300, of the present merged magnetic head which has a second pole piece with a second pole tip component 302 and a second pole yoke component 303. In this embodiment a rear portion of the second pole tip component 302 is constructed on top of a front portion of the first insulation layer 304 of the insulation stack. The insulation layer 304 has a front edge 306 which defines a zero throat height (ZTH) of the head. Accordingly, after constructing the first insulation layer 304 the second pole tip component 302 is constructed by frame plating. As shown in FIGS. 15 and 17 the second pole yoke component 304 is stitched to a top surface 308 and back and the first and second side edges 310, 312 and 314 of the second pole tip component. The stitching to the back edge 310 is made possible by spacing the second and third insulation layers 316 and 318 from the back edge 310. In the preferred embodiment the front end 320 of the second pole yoke component 303 is recessed in the head a distance from the flare point (FP) as shown in FIGS. 15 and 16. As stated hereinabove the flare point is the point at which the second pole tip component first commences to widen after the pole tip portion 322 as shown in FIG. 16. In all embodiments of the invention it is preferred that the flare point (FP) be recessed from the ZTH and that the front end 320 of the second pole yoke component be recessed from the flare point. In this embodiment the overcoat layer 324 surrounds the second pole yoke component 303 as illustrated in FIG. 17.

Figure 18:
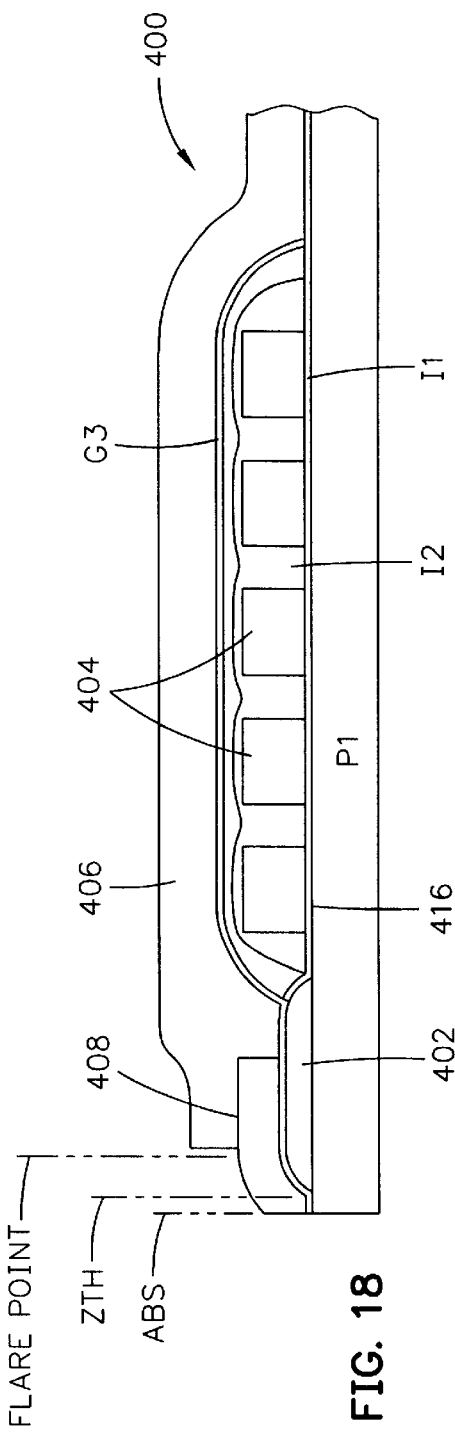
FIG. 18 is a longitudinal cross-sectional view of a portion of a merged MR head with still another embodiment of a multi-stitched write head portion.
Figure 19:
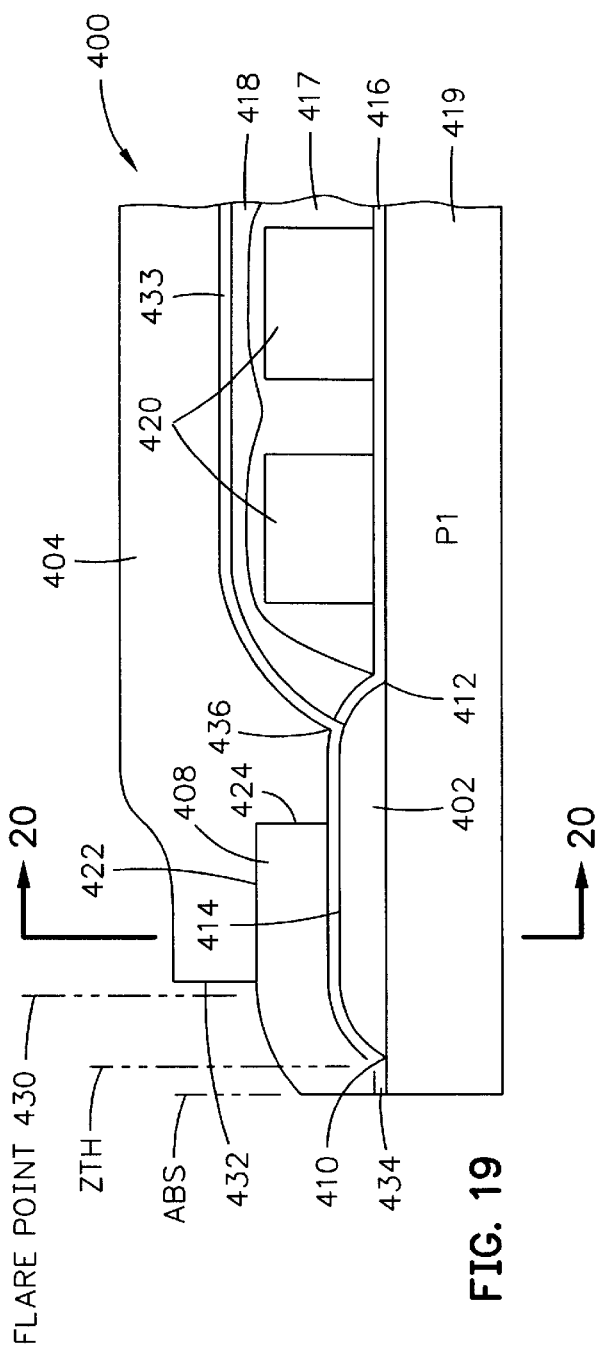
FIG. 19 is an enlarged front portion of FIG. 18.

FIGS. 18 and 19 illustrates a further embodiment 400 of the present invention which employs a zero throat height (ZTH) defining layer 402 which is located entirely between the ABS and the coil layer 404. The ZTH defining layer 402 not only more accurately defines the ZTH, but it further decreases flux leakage between the first and second pole pieces. The second pole piece includes a second pole yoke component 406 which is stitched at multiple locations to the second pole tip component 408. As shown in FIG. 19 the ZTH defining layer 402 has forward and back edges 410 and 412 with a flat portion 414 therebetween. The ZTH defining layer 402 may be constructed of hard baked photoresist or of alumina ($Al_2O_3$) which is formed by sputtering onto a bi-layer photoresist. This material will provide excellent magnetic insulation between the second pole tip component 408 and the first pole piece layer so as to minimize flux leakage.

Figure 20:
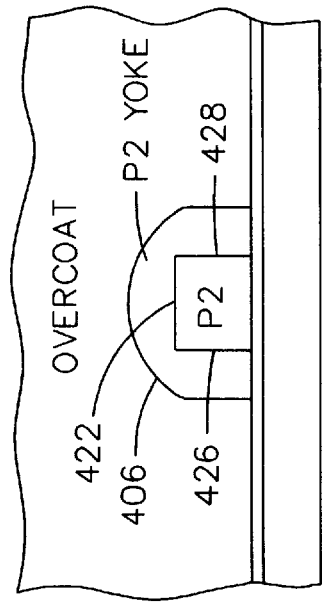
FIG. 20 is a cross-sectional view taken along plane 20—20 of FIG. 19 with additional layers of a read head portion.

The insulation stack includes a first insulation layer 416 of a thin layer of alumina and second and third insulation layers 417 and 418 of baked photoresist. Located on top of layer 416 is the coil layer 420. The second and/or third layers 417 and 418 preferably completely cover a rear sloping portion of the ZTH defining layer 402 so that when the second pole yoke component 406 is stitched to the second pole tip component 408 the second pole yoke component 406 will be located further from the first pole piece layer 419 so as to minimize flux leakage. As shown in FIGS. 19 and 20 the second pole yoke component 406 is stitched to the top surface 422 and the back and first and second side edges 424, 426 and 428 of the second pole tip component 408. The flare point is shown in phantom at 430 in FIG. 19. In the preferred embodiment the front end 432 of the second pole yoke component 406 is recessed into the head from the flare point 430. It should be noted that the flare point 430 is located on the flat portion 414 of the ZTH defining layer. Accordingly, when the second pole tip component 408 is constructed, light reflected from the ZTH defining layer 402 during the photo-patterning step will not cause reflective notching as discussed hereinabove. Reflective notching will only be caused when the flare point 430 is located on an underlying sloping portion.

In the preferred embodiment an extension 433 of the write gap layer 434 is located on top of the insulation stack. In the construction of the head the layer 416 originally extended to the ABS. The coil layer 420 and the insulation layers 417 and 418 were then formed. In the preferred embodiment the portion (not shown) of the layer 416 that originally extended forward of 436 is removed and the gap layer 434 and its extension 433 are deposited. This is done so that the gap layer 434 will not be altered by the processing steps in making the insulation stack and the coil layer. It should noted that during the existence of the portion of the layer 416 forward of the location 436 that the forward edge 410 of the ZTH defining layer was protected during processing steps of the insulation stack and the coil layer so that the ZTH of the head was not altered.

Figure 21:
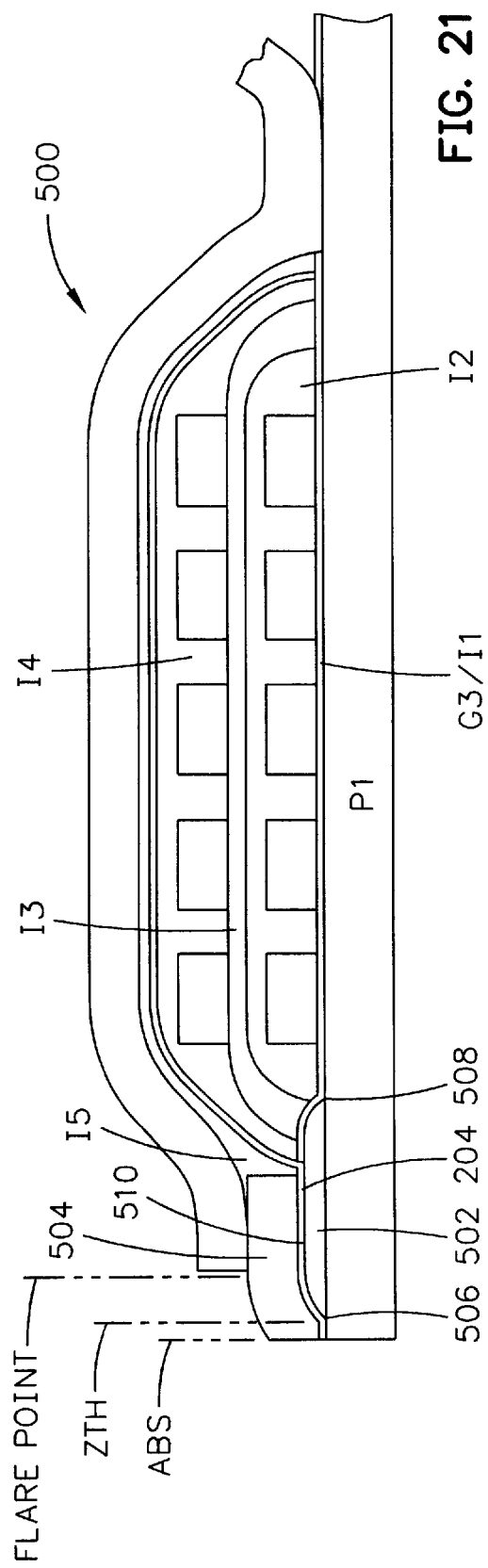
FIG. 21 is a longitudinal cross-sectional view of a portion of a double coil merged MR head employing the present invention.
Figure 22:
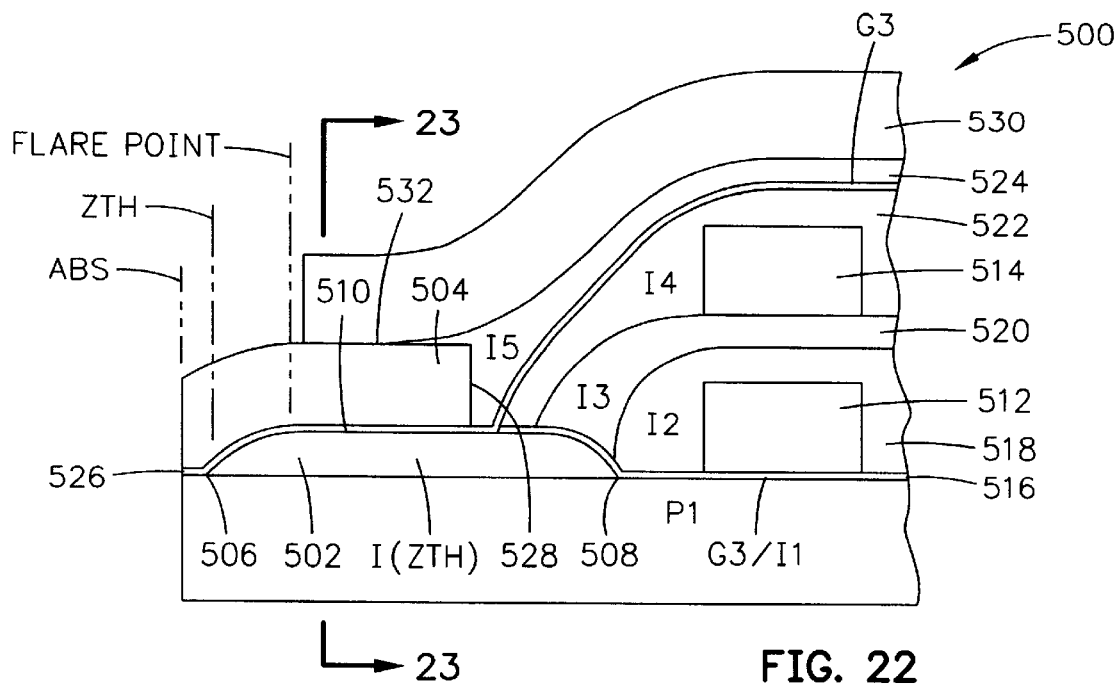
FIG. 22 is an enlarged front portion of FIG. 21.

In FIG. 21 there is shown a dual layer magnetic head 500 employing the multistitch scheme of the present invention. Similarly to the magnetic head 400 shown in FIG. 18 the head 500 in FIG. 21 employs a ZTH defining layer 502 which is located under a rear portion of a second pole tip component 504. As shown in FIG. 22, the ZTH defining layer 502 has forward and rear edges 506 and 508 with a flat portion 510 located therebetween. The insulation stack includes first and second coil layers 512 and 514 and first, second, third, fourth and fifth insulation layers 516, 518, 520, 522 and 524. The first insulation layer 516 abuts the write gap layer 526. The first coil layer 512 sits directly on the first insulation layer 516 and the insulation layers 518 and 520 are on the first coil layer 512. The second coil layer 514 is directly on the third insulation layer 520 and is covered by the fourth and fifth insulation layers 522 and 524. The second, third, fourth and/or fifth insulation layers cover a rear portion of the ZTH defining layer 502 so that the flat portion 510 of the ZTH defining layer extends forward of the insulation stack. The second pole tip component 504 of the second pole piece is located directly on the gap layer 526 with a flare point 526 located on the flat portion 510 of the ZTH defining layer so that reflective notching of the second pole piece is obviated as discussed hereinabove.

Figure 23:
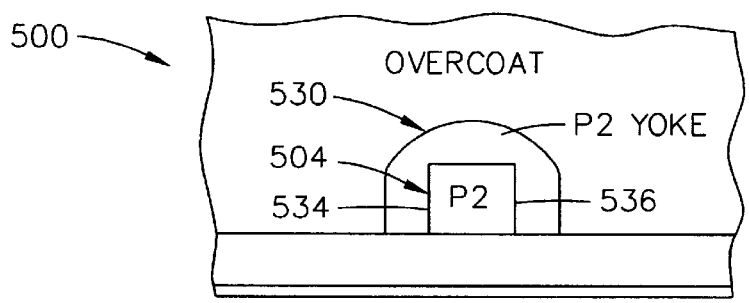
FIG. 23 is a cross-sectional view taken along plane 23—23 of FIG. 22.

The insulation stack provides a space between its forward position and side edges of the ZTH defining layer. As shown in FIG. 22, the second pole yoke component 530 of the second pole piece engages a top surface 532 and first and second side edges 534 and 536 (See FIG. 23) of the second pole tip component. The insulation stack with the coil layers 512 and 514 may be constructed before or after the second pole tip component 504. In a preferred embodiment the second pole tip component 504 is constructed before the insulation stack. After construction of the insulation stack a common layer portion (not shown) with the first insulation layer 516 located between the ZTH defining layer 502 and the second pole tip component 504 is removed and the gap layer 526, which is alumina, is formed.

Figure 24A:
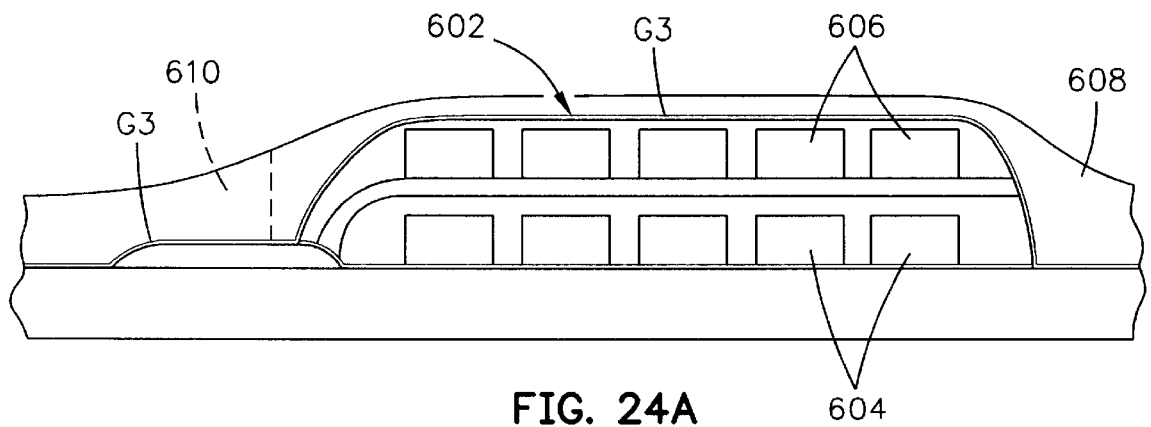
FIGS. 24A–24D illustrate various steps in the construction of a double coil magnetic head with a single area stitch scheme.
Figure 24B:
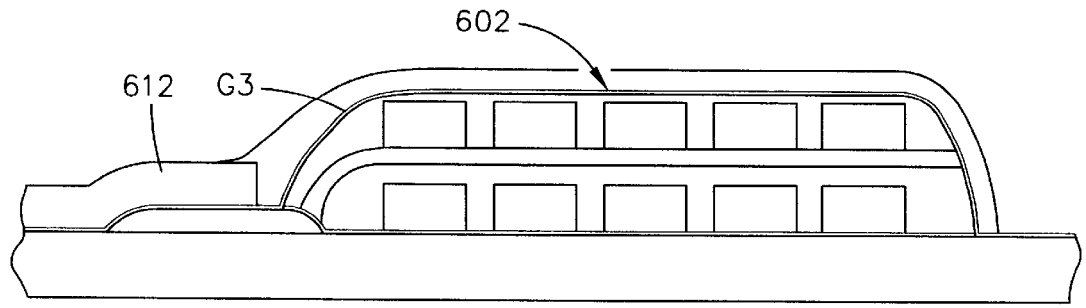
Figure 24C:
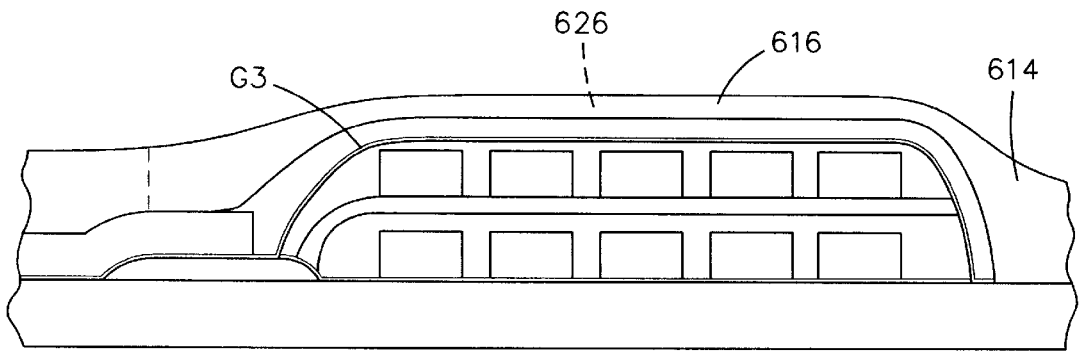
Figure 24D:
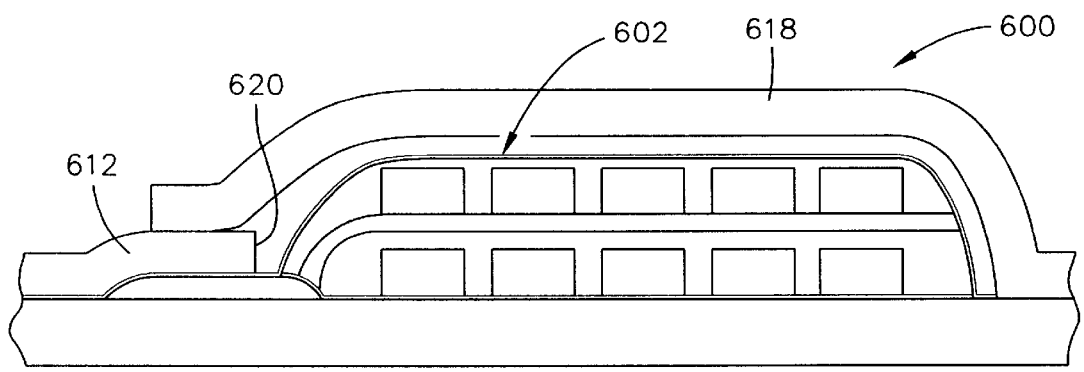

FIGS. 24A–24D show a series of steps in constructing a dual coil prior art magnetic head 600 as shown in FIG. 24D. After construction of the insulation stack 602 including first and second coil layers 604 and 606 a photoresist layer 608 is spun on the wafer and photopatterned to provide an opening as shown in phantom at 610. In FIG. 24B the second pole tip component 612 of the second pole piece is frame plated into the opening 610 of FIG. 24A and the photoresist frame 608 is removed leaving the partially completed head as shown in FIG. 24B. Another photoresist frame 614 is then spun on the head and photopatterned to provide an opening 616 for construction of the second pole yoke component 618 of the second pole piece. The second layer component 618 is then frame plated in the opening 616 and the photoresist frame 614 is removed leaving the partially completed head 600 as shown in FIG. 24D. It should be noted in this embodiment that the insulation stack covers the rear or back edge 620 of the second pole tip component which prevents the second pole yoke component 618 from engaging the back edge 620.

Figure 25A:
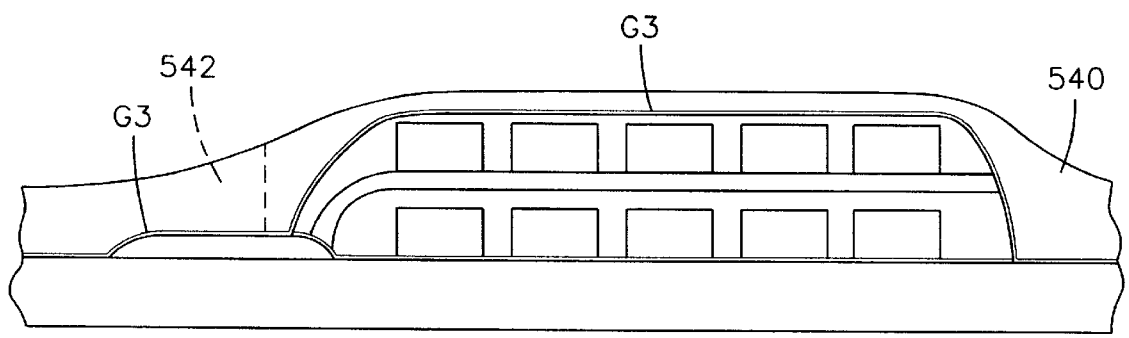
FIGS. 25A–25C illustrate various steps in the construction of the present double coil magnetic head shown in FIG. 21.
Figure 25B:
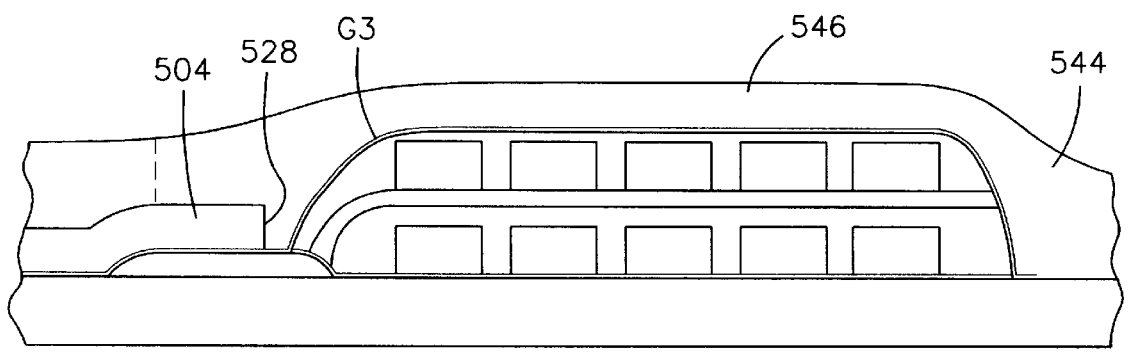
Figure 25C:
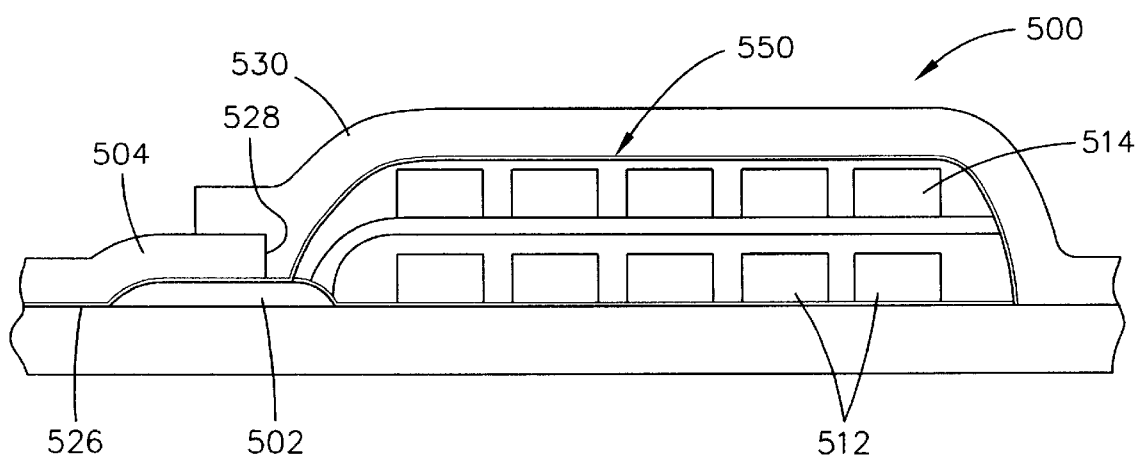

FIGS. 25A–25C show a series of steps in the construction of the dual coil layer magnetic write head 500 of the present invention as shown in FIG. 21. In FIG. 25A a photoresist layer 540 is spun on the head and is photopatterned to provide an opening 542. In FIG. 25B the second pole tip component 504 of the second pole piece has been frame plated in the opening 542 in FIG. 25A and the photoresist pattern 540 has been removed, and another photoresist layer 544 is spun on the head and is photopatterned to provide an opening 546. The second pole yoke component 530 is frame plated into the opening 546 in FIG. 25B and the photoresist frame 544 is then removed leaving the partially completed head shown at 500 in FIG. 25C. In this embodiment the insulation stack 550 is spaced from the back edge 528 of the second pole tip component and the opening 542 in the photoresist frame 540 in FIG. 25A is spaced from the first and second side edges 534 and 536 shown in FIG. 23. Accordingly, this provides the trench for configuring the second pole yoke component 530 about the back and side edges of the second pole tip component 504.

Figure 26:
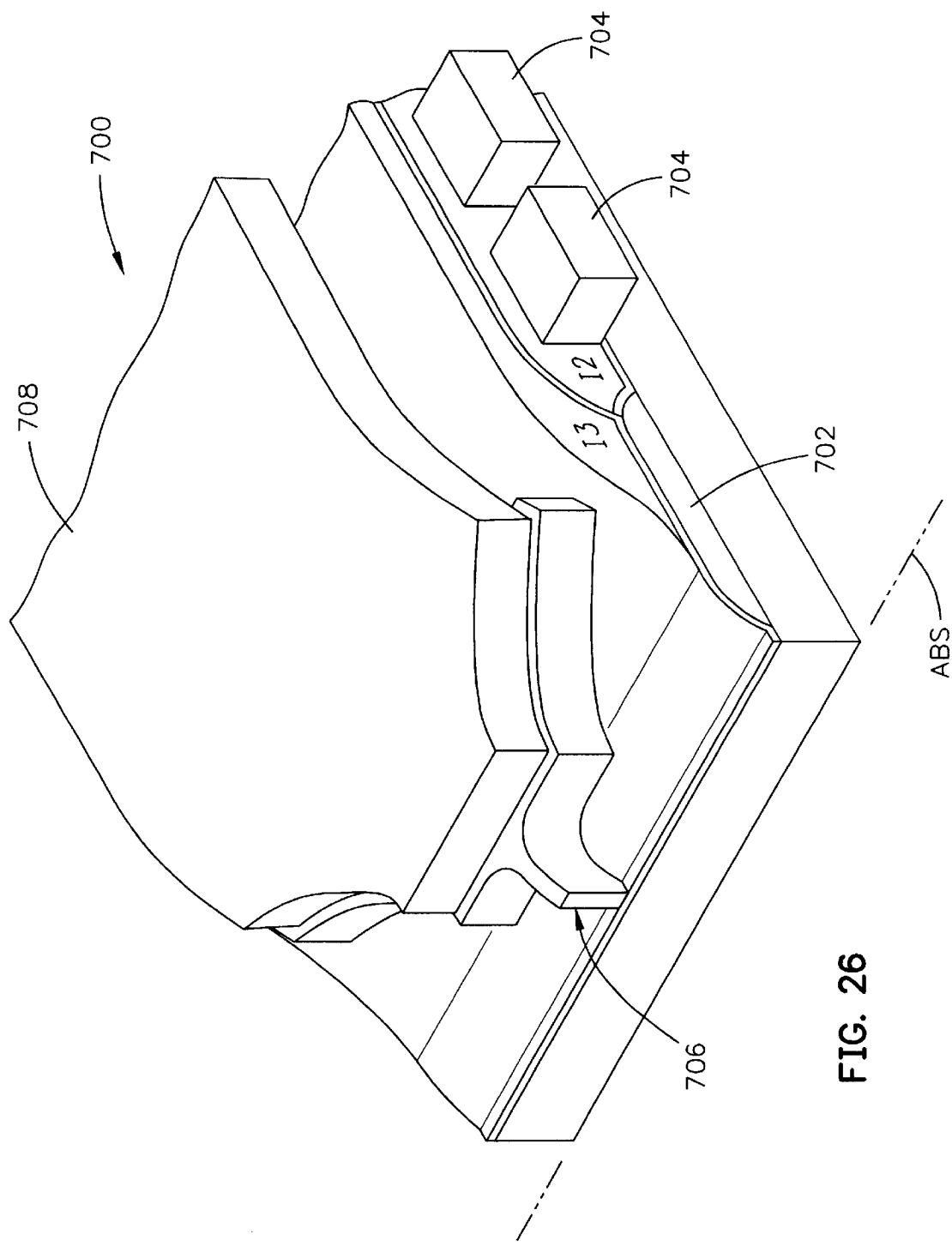
FIG. 26 is an isometric illustration of a single area stitched magnetic head.

In FIG. 26 an embodiment 700 of a partially completed magnetic head is shown wherein a prior art stitching arrangement is employed in combination with a ZTH defining layer 702 that is located entirely between an ABS and the coil layer 704. It can be seen from this embodiment that the stitching area between the second pole tip component 706 and the second pole yoke component 708 of the second pole piece is quite large in order to obtain the required flux transfer between these layers.

Figure 27:
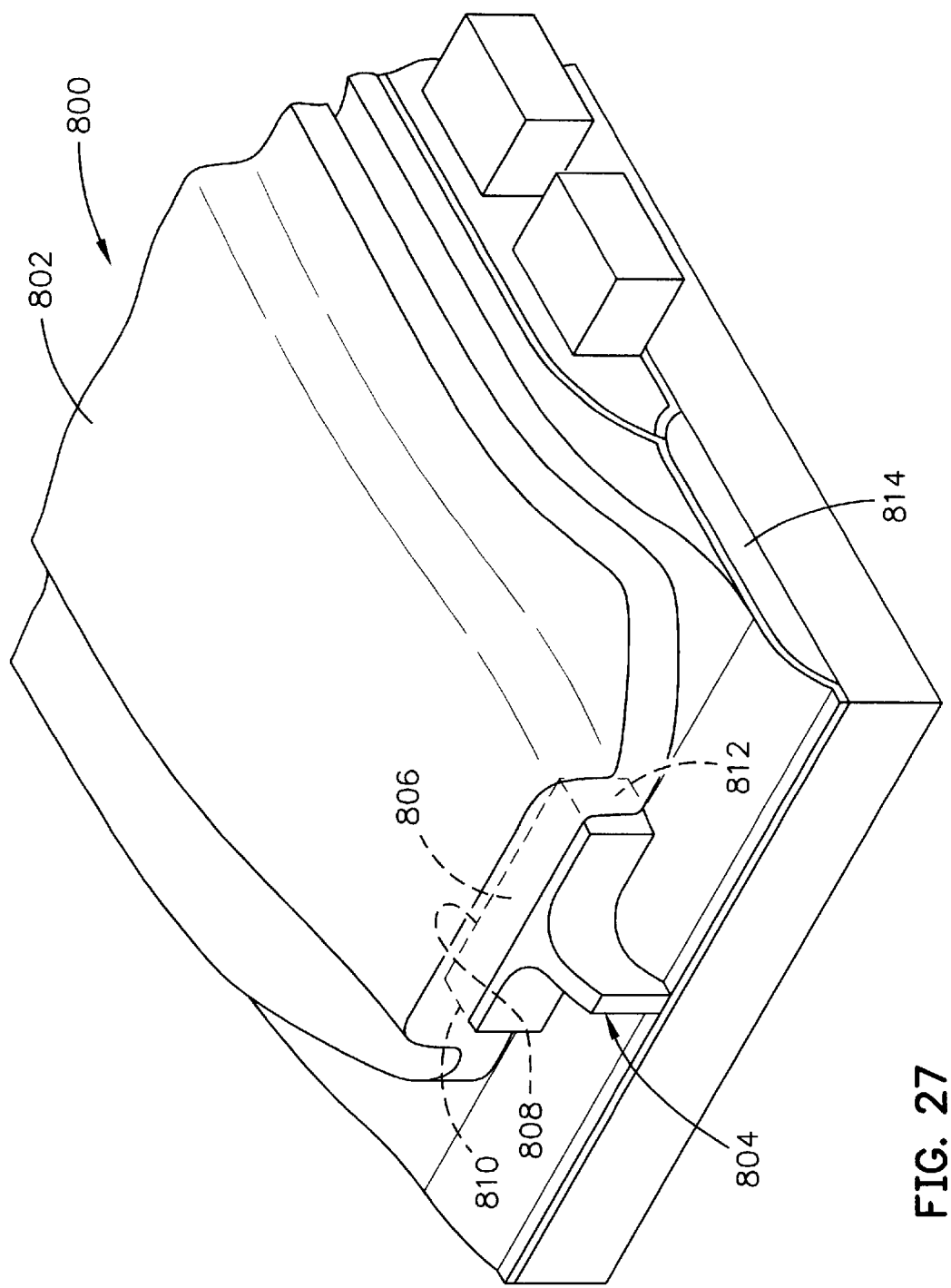
FIG. 27 is an isometric illustration of the present multi-stitched magnetic head.
Figure 28:
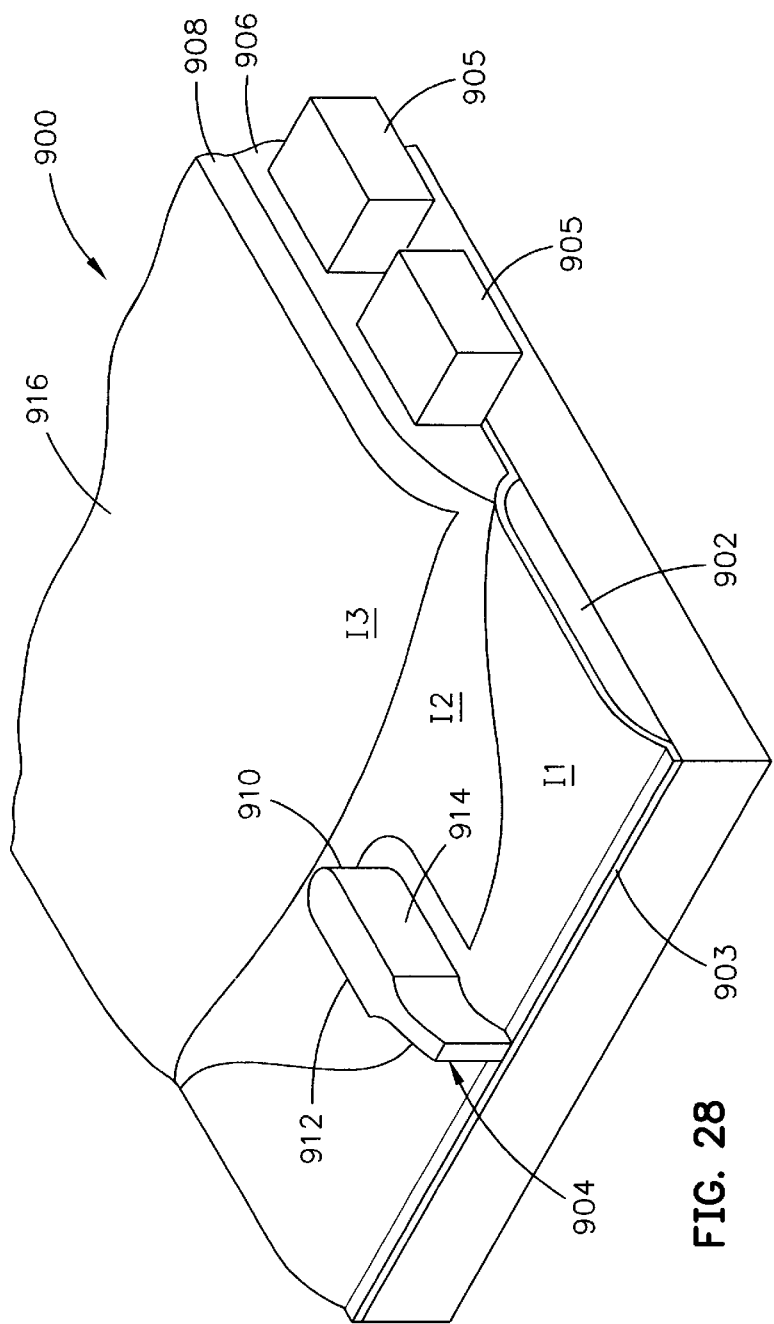
FIG. 28 is an isometric illustration of an embodiment of the present invention wherein one of the insulation layers of the insulation stack forms a trench for plating the yoke component of the second pole piece.

In FIG. 27 the present invention is employed to improve the stitching arrangement of a magnetic head 800 wherein the second pole yoke component 802 is stitched at multiple surfaces to the second pole tip component 804. The second pole yoke component 802 is stitched to a significantly smaller top surface 806 and back and first and second side edges 808, 810 and 812. The ZTH defining layer is shown at 814.

Figure 29:
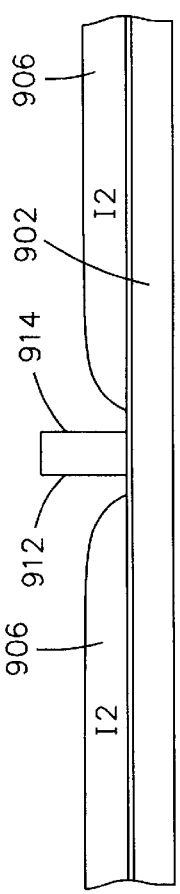
FIG. 29 is a cross-sectional view taken of the second pole tip component and insulation layer of the insulation stack of FIG. 28 to show the trench in more detail.
Figure 30:
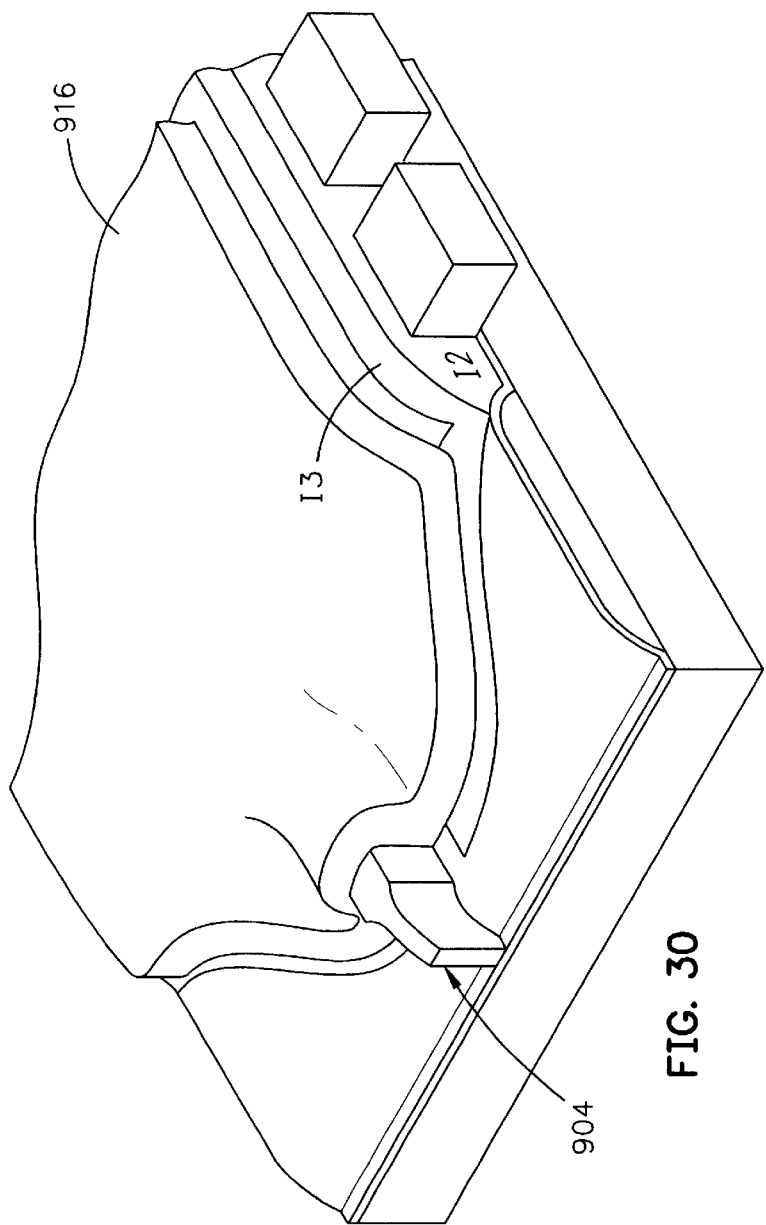
FIG. 30 is the same as FIG. 28 except the second pole yoke component and the second pole piece have been formed.
Figure 31:
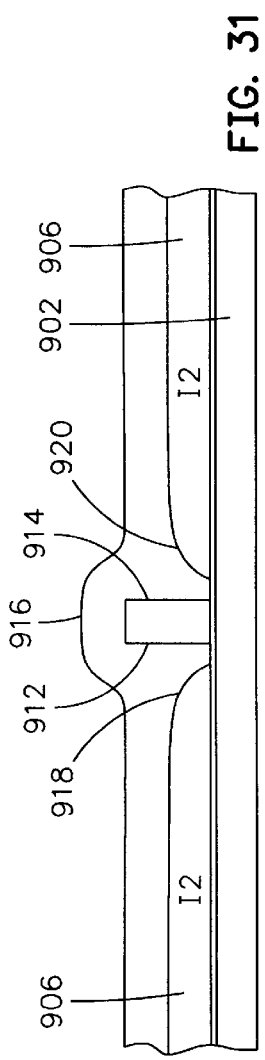
FIG. 31 is a cross-sectional view of FIG. 30 showing the second pole tip and second pole yoke components and an insulation layer of the insulation stack forming the trench.

FIGS. 28–31 illustrate still another embodiment 900 of the present magnetic head. After construction of the ZTH defining layer 902 and a write gap layer 903 thereon a slender second pole tip component 904 may be constructed thereon by frame plating. After construction of a coil layer 905, second and third insulation layers 906 and 908 may be constructed with one of these layers, preferably the second insulation layer 906 being formed so that it is spaced from back and first and second side edges 910, 912 and 914 of the second pole tip component. Alternatively, the second pole tip component 904 may be constructed after construction of the coil layer 905 and the insulation layer 906 and 908. The spacing provides a U-shaped trench around a back portion of the second pole tip component 904 for the placement of the front portion of the second pole yoke component 916 which will be discussed hereinafter. FIG. 29 shows the spaced configuration between the second insulation layer and the first and second side edges 912 and 914. In FIG. 30 the second pole yoke component 916 has been constructed with a front portion of the second pole yoke component residing in the U-shaped trench as shown in FIG. 31. The second insulation layer of the insulation stack is constructed of photoresist which provides sloping surfaces at 918 and 920 in FIG. 31. This will permit full area stitching between the front portion of the second pole yoke component and the first and second side edges 912 and 914 with less material of the front portion of the second pole yoke component 916 adjacent the first pole piece for the purpose of minimizing flux leakage therebetween.

Figure 32:
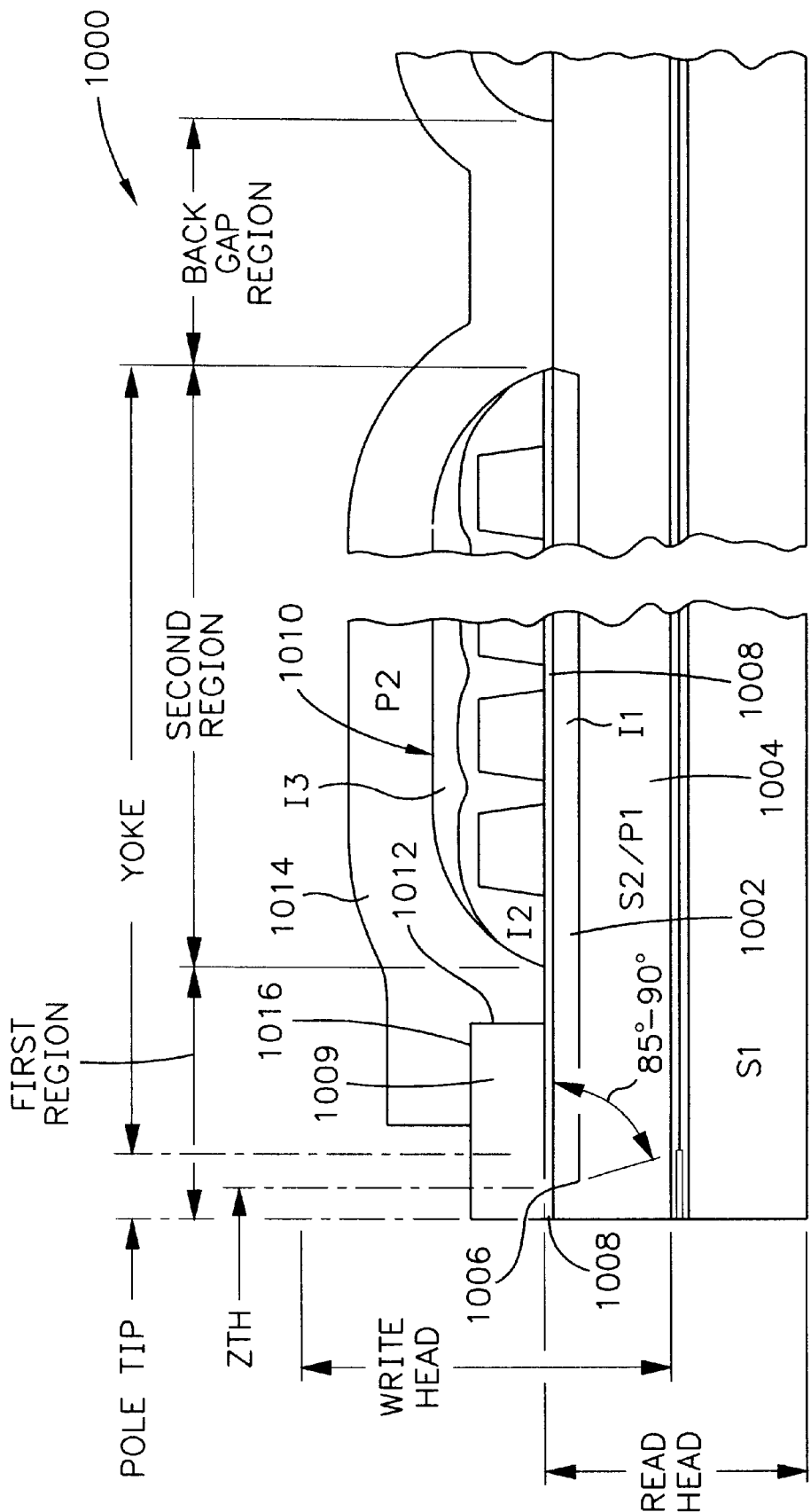
FIG. 32 is a longitudinal cross-sectional view of a portion of a merged MR head wherein the present invention is employed with a ZTH defining layer inset in a first pole piece.

FIG. 32 illustrates another embodiment 1000 of the present invention wherein the ZTH defining layer 1002 is inset within a recess of the first pole piece layer 1004. The ZTH defining layer has a front edge 1006 which defines the ZTH of the head. The ZTH layer 1002 is also the first insulation layer (I1) of the insulation stack. The write gap layer 1008 is directly on the ZTH defining layer 1002. The second pole tip component 1009 is directly on the write gap layer 1008 and the insulation stack 1010 is spaced from a rear or back edge 1012 of the second pole tip component. The second pole yoke component 1014 engages the top surface 1016 as well as the back edge 1012 and first and second side edges of the second pole tip component as discussed hereinabove. The inset ZTH defining layer 1002 provides extra insulation between the second pole piece and the first pole piece 1004 to minimize flux leakage therebetween.

Figure 33:
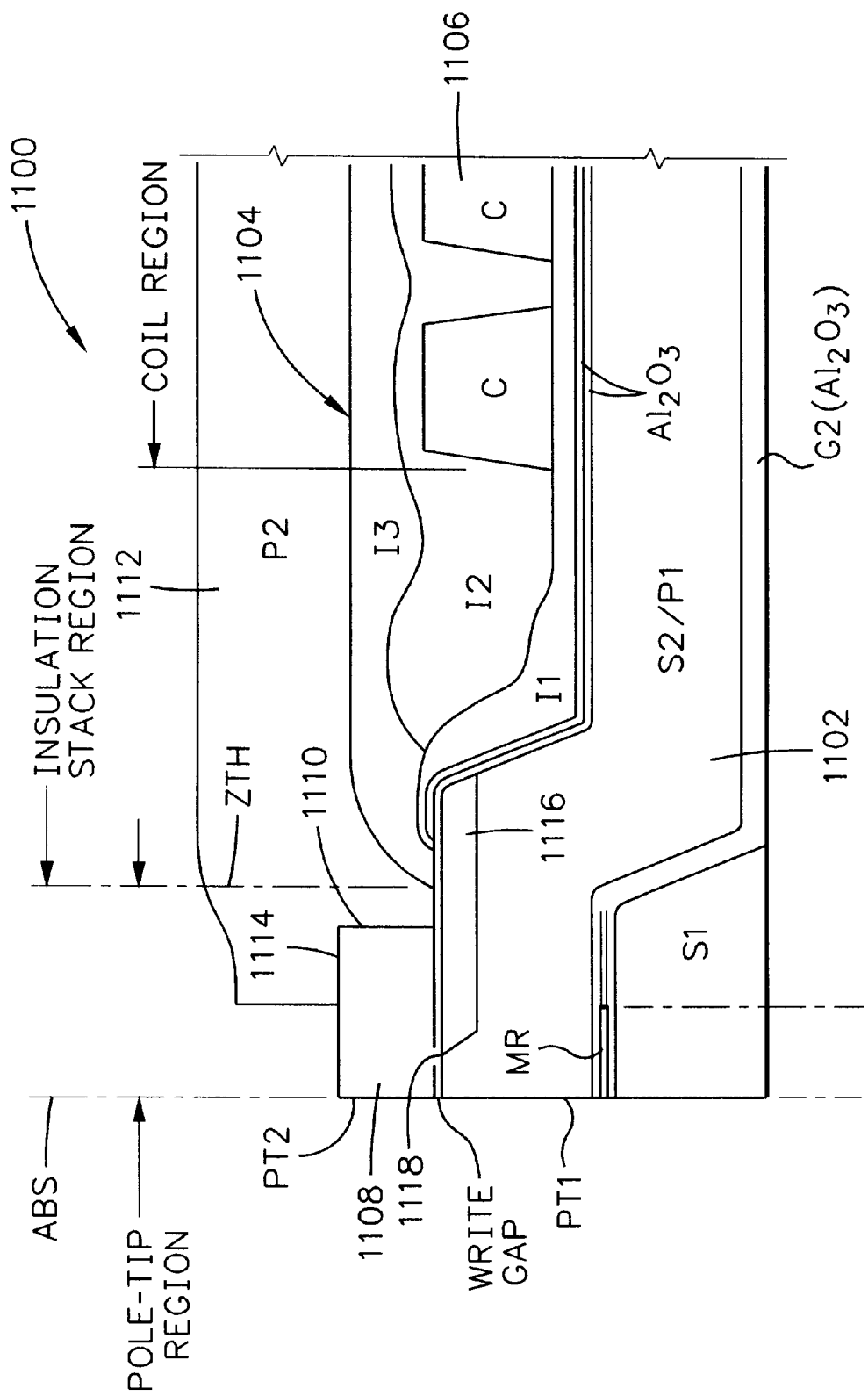
FIG. 33 is a longitudinal cross-sectional view of a portion of a merged MR head where the present invention has been employed with a sunken first pole piece type of head with a ZTH inset layer.

FIG. 33 illustrates still another embodiment 1100 of the present invention wherein the first pole piece layer 1102 is recessed a distance from the ABS to provide a well for placement of at least a portion of the insulation stack 1104 with at least one coil layer 1106. This embodiment has a second pole tip component 1108 with a back edge 1110 which is spaced from a front portion of the insulation stack 1104. A second pole yoke component 1112 is located in this space so as to engage the back edge 1110, the top surface 1114 and the first and second side edges of the second pole tip component so as to provide the multi-stitching scheme of the present invention. The ZTH may be defined by an inset insulation layer 1116 with the ZTH at edge 1118 as described for the embodiment 1,000 in FIG. 32.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. A magnetic head with a front located air bearing surface (ABS), a rear located back gap and a top and a bottom comprising:

first and second pole piece layers, the second pole piece layer having a front located second pole tip component and a rear located second pole yoke component;

a gap layer;

the first pole piece layer and the second pole tip component being separated by the gap layer at said ABS and the first pole piece layer and the second pole yoke component being connected at said back gap;

an insulation stack that includes a plurality of insulation layers and at least one coil layer embedded therein;

the insulation stack being sandwiched between the first pole piece layer and said second pole yoke component and being located between the second pole tip component and said back gap;

the second pole tip component being bounded by front and rear surfaces, first and second side surfaces and top and bottom surfaces, the front surface being located at said ABS and the first and second side surfaces and the top and bottom surfaces intersecting the ABS; and the second pole yoke component having a front portion which has a bottom surface, a back surface and first and second side surfaces that interface the top surface, the rear surface and the first and second side surfaces respectively of the second pole tip component.

2. A magnetic head as claimed in claim 1, including:

a zero throat height (ZTH) defining layer directly on the first pole piece layer and located entirely between the ABS and said at least one coil layer; and the ZTH defining layer having front and rear edges wherein the front edge defines a zero throat height (ZTH) of the head where the first pole piece layer and the second pole tip component first commence to separate after the ABS.

3. A magnetic head as claimed in claim 2, including:

the second pole tip component having a flare point that divides the second pole tip component into a front located pole tip portion and a rear located widened portion, the pole tip portion having a substantially uniform width and the widened portion progressively widening in a direction rearwardly from the flare point; and the second pole yoke component engaging the second pole tip component rearwardly of said flare point.

4. A magnetic head as claimed in 3, wherein the flare point is located rearwardly of the ZTH.

5. A magnetic head as claimed in claim 3, wherein the ZTH defining layer is on top of the gap layer.

6. A magnetic head as claimed in claim 3, wherein the gap layer is on top of the ZTH defining layer.

7. A magnetic head as claimed in claim 2, including:
a portion of said insulation stack covering said rear edge as well as a rear portion of the ZTH defining layer; and
the second pole tip component covering a front portion of the ZTH defining layer.

8. A magnetic head as claimed in claim 7, wherein said at least one coil layer is the only coil layer.

9. A magnetic head as claimed in claim 7, wherein said at least one coil layer is two coil layers.

10. A magnetic head as claimed in claim 2, including:
the ZTH defining layer having a flat surface between its front and rear edges; and
the second pole tip component having a flare point that divides the second pole tip component into a front located pole tip portion and a rear located widened portion, the pole tip portion having a substantially uniform width and the widened portion progressively widening in a direction rearwardly from the flare point;
the flare point being located rearwardly of the ZTH and on said flat top surface of the ZTH defining layer; and
the second pole yoke component engaging the second pole tip component rearwardly of said flare point.

11. A magnetic head as claimed in claim 10, including:
the second pole tip component having a flare point that divides the second pole tip component into a front located pole tip portion and a rear located widened portion, the pole tip portion having a substantially uniform width and the widened portion progressively widening in a direction rearwardly from the flare point; and
the second pole yoke component engaging the second pole tip component rearwardly of said flare point.

12. A magnetic head as claimed in claim 11, wherein the flare point is located rearwardly of the ZTH.

13. A magnetic head as claimed in claim 12, including:
a portion of said insulation stack covering said rear edge as well as a rear portion of the ZTH defining layer; and
the second pole tip component covering a front portion of the ZTH defining layer.

14. A magnetic head as claimed in claim 13, wherein the gap layer is on top of the ZTH defining layer.

15. A magnetic head as claimed in claim 14, wherein said at least one coil layer is the only coil layer.

16. A magnetic head as claimed in claim 14, wherein said at least one coil layer is two coil layers.

17. A magnetic head as claimed in claim 13, wherein the gap layer is also the first insulation layer of the insulation stack.

18. A magnetic head as claimed in claim 17, wherein said at least one coil layer is the only coil layer.

19. A magnetic head as claimed in claim 17, wherein said at least one coil layer is two coil layers.

20. A magnetic head as claimed in claim 1, including:
one of the insulation layers of the insulation stack being spaced from each of the rear surface and the first and second side surfaces of the second pole tip component to form a U shaped trench adjacent the second pole tip component; and
said front portion of the second pole tip component being located within said U shaped trench.

21. A magnetic head as claimed in claim 20, including:
a zero throat height (ZTH) defining layer directly on the first pole piece layer and located entirely between the ABS said at least one coil layer; and
the ZTH defining layer having front and rear edges wherein the front edge defines a zero throat height (ZTH) of the head where the first pole piece layer and the second pole tip component first commence to separate after the ABS.

22. A magnetic head as claimed in claim 21, including:
the ZTH defining layer having a flat surface between its front and rear edges; and
the second pole tip component having a flare point that divides the second pole tip component into a front located pole tip portion and a rear located widened portion, the pole tip portion having a substantially uniform width and the widened portion progressively widening in a direction rearwardly from the flare point;
the flare point being located rearwardly of the ZTH and on said flat top surface of the ZTH defining layer; and
the second pole yoke component engaging the second pole tip component rearwardly of said flare point.

23. A magnetic head as claimed in claim 22, including:
a portion of said insulation stack covering said rear edge as well as a rear portion of the ZTH defining layer; and
the second pole tip component covering a front portion of the ZTH defining layer.

24. A magnetic head as claimed in claim 23, wherein the gap layer is on top of the ZTH defining layer.

25. A magnetic head as claimed in claim 24, wherein the gap layer is also the first insulation layer of the insulation stack.

26. A magnetic head as claimed in claim 25, including:
the insulation stack having at least first, second and third insulation layers wherein the first insulation layer is a bottom located insulation layer; and
said one of the insulation layers being said first insulation layer.

27. A magnetic head as claimed in claim 1, including:
the insulation stack having at least first, second and third insulation layers wherein each insulation layer has a front portion with a forward edge;
a rear portion of the second pole tip component being on the front portion of the first insulation layer so that the formed edge of the first insulation layer defines a zero throat height (ZTH) where the second pole tip component first commences to separate from the first pole piece layer after the ABS; and
the second insulation layer being spaced from the second pole tip component.

28. A magnetic head as claimed in claim 1, including:
the first pole piece layer having a recess that commences at a zero throat height (ZTH) location that is spaced from the ABS a distance and that extends from the ZTH location rearwardly into the head;
a zero throat height (ZTH) defining layer located within said recess and having a front edge at said ZTH location so as to define a zero throat height (ZTH) of the head where the first pole piece and the second pole tip component first commence to separate after the ABS.

29. A magnetic head as claimed in claim 28, including:
one of the insulation layers of the insulation stack being spaced from each of the rear surface and the first and second side surfaces of the second pole tip component to form a U shaped trench adjacent the second pole tip component; and
said front portion of the second pole tip component being located within said U shaped trench.

30. A magnetic head as claimed in claim 29, including:

the second pole tip component having a flare point that divides the second pole tip component into a front located pole tip portion and a rear located widened portion, the pole tip portion having a substantially uniform width and the widened portion progressively widening in a direction rearwardly from the flare point; and the second pole yoke component engaging the second pole tip component rearwardly of said flare point.

31. A magnetic head as claimed in claim 1, including:

said first pole piece layer having a recess that is located rearwardly of said ABS, and the insulation stack and said at least one coil layer being located within said recess.

32. A magnetic head as claimed in claim 31, including:

one of the insulation layers of the insulation stack being spaced from each of the rear surface and the first and second side surfaces of the second pole tip component to form a U shaped trench adjacent the second pole tip component; and said front portion of the second pole tip component being located within said U shaped trench.

33. A magnetic head as claimed in claim 32, including:

the second pole tip component having a flare point that divides the second pole tip component into a front located pole tip portion and a rear located widened portion, the pole tip portion having a substantially uniform width and the widened portion progressively widening in a direction rearwardly from the flare point; and the second pole yoke component engaging the second pole tip component rearwardly of said flare point.

34. A merged magnetic head that has an air bearing surface (ABS) comprising:

a write head including:

first and second pole piece layers, the second pole piece layer having a second pole tip component and a second pole yoke component;

a gap layer;

the first pole piece layer and the second pole tip component being separated by the gap layer at said ABS and the first pole piece layer and the second pole yoke component being connected at said back gap;

an insulation stack that includes a plurality of insulation layers and at least one coil layer embedded therein;

the insulation stack being sandwiched between the first pole piece layer and said second pole yoke component and being located between the second pole tip component and said back gap;

the second pole tip component being bounded by front and rear surfaces, first and second side surfaces and top and bottom surfaces, the front surface being located at said ABS and the first and second side surfaces and the top and bottom surfaces intersecting the ABS; and the second pole yoke component having a front portion which has a bottom surface, a back surface and first and second side surfaces that interface the top surface, the rear surface and the first and second side surfaces respectively of the second pole tip component; and a read head including:

a sensor and first and second gap layers;

the sensor being sandwiched between the first and second gap layers;

first and second ferromagnetic shield layers;

the first and second gap layers being sandwiched between the first and second shield layers; and the second shield layer and the first pole piece layer being a common layer.

35. A merged magnetic head as claimed in claim 34, including:

one of the insulation layers of the insulation stack being spaced from each of the back surface and the first and second side surfaces of the second pole tip component to form a U shaped trench adjacent the second pole tip component; and said front portion of the second pole yoke component being located within said U shaped trench.

36. A merged magnetic head as claimed in claim 35, including:

a zero throat height (ZTH) defining insulation layer directly on the first pole piece layer and located entirely between the ABS said at least one coil layer; and the ZTH defining insulation layer having front and rear edges wherein the front edge defines a zero throat height (ZTH) of the head where the first pole piece layer and the second pole tip component first commence to separate after the ABS.

37. A merged magnetic head as claimed in claim 36, including:

the ZTH defining insulation layer having a flat surface between its front and rear edges; and the second pole tip component having a flare point that divides the second pole tip component into a front located pole tip portion and a rear located widened portion, the pole tip portion having a substantially uniform width and the widened portion progressively widening in a direction rearwardly from the flare point;

the flare point being located rearwardly of the ZTH and on said flat top surface of the ZTH defining layer; and the second pole yoke component engaging the second pole tip component rearwardly of said flare point.

38. A merged magnetic head as claimed in claim 37, including:

a portion of said insulation stack covering said rear edge as well as a rear portion of the ZTH defining layer; and the second pole tip component covering a front portion of the ZTH defining layer.

39. A magnetic disk drive that includes at least one merged magnetic head that has an air bearing surface (ABS), the disk drive comprising:

the merged magnetic head having a write head portion that includes:

first and second pole piece layers, the second pole piece layer having a second pole tip component and a second pole yoke component;

a gap layer;

the first pole piece layer and the second pole tip component being separated by the gap layer at said ABS and the first pole piece layer and the second pole yoke component being connected at said back gap;

an insulation stack that includes a plurality of insulation layers and at least one coil layer embedded therein;

the insulation stack being sandwiched between the first pole piece layer and said second pole yoke component and being located between the second pole tip component and said back gap;

the second pole tip component being bounded by front and rear surfaces, first and second side surfaces and top and bottom surfaces, the front surface being located at said ABS and the first and second side surfaces and the top and bottom surfaces intersecting the ABS; and the second pole yoke component having a front portion which has a bottom surface, a back surface and first and second side surfaces that interface the top surface, the rear surface and the first and second side surfaces respectively of the second pole tip component;

the merged magnetic head having a read head portion that includes:

a read sensor and first and second gap layers;

the read sensor being sandwiched between the first and second gap layers;

first and second ferromagnetic shield layers;

the first and second gap layers being sandwiched between the first and second shield layers; and the second shield layer and the first pole piece layer being a common layer;

a frame;

a magnetic disk rotatably supported on the frame;

a support mounted on the frame for supporting the merged magnetic head in a transducing relationship with the magnetic disk;

means for rotating the magnetic disk;

positioning means connected to the support for moving the merged magnetic head to multiple positions with respect to said magnetic disk; and means connected to the merged magnetic head, to the means for rotating the magnetic disk and to the positioning means for exchanging signals with the merged magnetic head, for controlling movement of the magnetic disk and for controlling the position of the merged magnetic head.

40. A magnetic disk drive as claimed in claim 39, including:

one of the insulation layers of the insulation stack being spaced from each of the back surface and the first and second side surfaces of the second pole tip component to form a U shaped trench adjacent the second pole tip component; and said front portion of the second pole yoke component being located within said U shaped trench.

41. A magnetic disk drive as claimed in claim 40, including:

a zero throat height (ZTH) defining layer directly on the first pole piece layer and located entirely between the ABS said at least one coil layer; and the ZTH defining layer having front and rear edges wherein the front edge defines a zero throat height (ZTH) of the head where the first pole piece layer and the second pole tip component first commence to separate after the ABS.

42. A magnetic disk drive as claimed in claim 41, including:

the ZTH defining layer having a flat surface between its front and rear edges; and the second pole tip component having a flare point that divides the second pole tip component into a front located pole tip portion and a rear located widened portion, the pole tip portion having a substantially uniform width and the widened portion progressively widening in a direction rearwardly from the flare point;

the flare point being located rearwardly of the ZTH and on said flat top surface of the ZTH defining layer; and the second pole yoke component engaging the second pole tip component rearwardly of said flare point.

43. A magnetic disk drive as claimed in claim 42, including:

a portion of said insulation stack covering said rear edge as well as a rear portion of the ZTH defining layer; and the second pole tip component covering a front portion of the ZTH defining layer.

* * * * *